United States Patent
Camilo et al.

(10) Patent No.: US 12,071,491 B2
(45) Date of Patent: Aug. 27, 2024

(54) PROCESSING OF POLYETHYLENE-BASED COMPOSITIONS AND PRODUCTS THEREFROM

(71) Applicant: Braskem S.A., Camaçari (BR)

(72) Inventors: Ana Paula Rodrigues Camilo, São Paulo (BR); Kimberly Miller McLoughlin, Philadelphia, PA (US); Marcelo Farah, São Paulo (BR); Regina Funck Nonemacher, São Paulo (BR); Ana Paula de Azeredo, São Paulo (BR)

(73) Assignee: Braskem S.A., Camaçari (BR)

( * ) Notice: Subject to any disclaimer, the term of this patent is extended or adjusted under 35 U.S.C. 154(b) by 257 days.

(21) Appl. No.: 17/526,667

(22) Filed: Nov. 15, 2021

(65) Prior Publication Data
US 2022/0153883 A1  May 19, 2022

Related U.S. Application Data

(60) Provisional application No. 63/113,619, filed on Nov. 13, 2020, provisional application No. 63/113,570, filed on Nov. 13, 2020.

(51) Int. Cl.
| | | |
|---|---|---|
| C08F 10/02 | (2006.01) |
| B29C 48/40 | (2019.01) |
| C08J 3/18 | (2006.01) |
| C08K 5/098 | (2006.01) |
| C08K 5/14 | (2006.01) |
| C08K 5/32 | (2006.01) |
| C08L 23/12 | (2006.01) |
| C08L 23/16 | (2006.01) |
| C08L 23/30 | (2006.01) |
| C09J 123/30 | (2006.01) |
| B29L 31/00 | (2006.01) |

(52) U.S. Cl.
CPC .............. *C08F 10/02* (2013.01); *B29C 48/40* (2019.02); *C08J 3/18* (2013.01); *C08K 5/098* (2013.01); *C08K 5/14* (2013.01); *C08K 5/32* (2013.01); *C08L 23/12* (2013.01); *C08L 23/16* (2013.01); *C08L 23/30* (2013.01); *C09J 123/30* (2013.01); *B29L 2031/726* (2013.01); *C08F 2810/10* (2013.01); *C08J 2323/30* (2013.01); *C08L 2203/30* (2013.01); *C08L 2207/20* (2013.01)

(58) Field of Classification Search
CPC ................................................ C08F 2810/10
See application file for complete search history.

(56) References Cited

U.S. PATENT DOCUMENTS

| | | |
|---|---|---|
| 5,393,831 A | 2/1995 | Hudson |
| 6,620,892 B1 | 9/2003 | Bertin et al. |
| 10,131,847 B2 | 11/2018 | McNamara et al. |
| 2013/0095542 A1 | 4/2013 | Pereira et al. |
| 2013/0245203 A1 | 9/2013 | Horst et al. |
| 2014/0046102 A1 | 2/2014 | D'Amato et al. |
| 2016/0145412 A1 | 5/2016 | Lake, Jr. et al. |
| 2017/0320975 A1* | 11/2017 | Fiebig ...................... D01D 5/08 |
| 2019/0136100 A1* | 5/2019 | Tran ................... C09J 123/0815 |
| 2019/0366591 A1 | 12/2019 | Farah et al. |

FOREIGN PATENT DOCUMENTS

| | | |
|---|---|---|
| EP | 3056531 A1 | 8/2016 |
| EP | 3235833 A1 | 10/2017 |
| FR | 2030470 A5 | 11/1970 |
| WO | 2019000039 A1 | 1/2019 |

OTHER PUBLICATIONS

Sjoqvist, J. Polym. Environ (2011) 19:335-340 (Year: 2011).*
International Preliminary Report on Patentability issued in corresponding International Application No. PCT/IB2021/022231 mailed Jan. 24, 2023 (8 pages).
International Search Report issued in corresponding International Application No. PCT/IB2021/022232, mailed Feb. 22, 2022 (3 pages).
International Search Report issued in corresponding International Application No. PCT/IB2021/022231, mailed Feb. 18, 2022 (5 pages).
Written Opinion of the International Searching Authority issued in International Application No. PCT/IB2021/022232, dated Feb. 22, 2022 (6 pages).
Written Opinion of the International Searching Authority issued in corresponding International Application No. PCT/IB2021/022231, mailed Feb. 18, 2022 (7 pages).
H. Münstedt, "Rheological properties and molecular structure of polymer melts," Soft Matter, 7, pp. 2273-2283, Dec. 22, 2010 (11 pages).
A. Eckstein et al., "Determination of Plateau Moduli and Entanglement Molecular Weights of Isotactic, Syndiotactic, and Atactic Polypropylenes Synthesized with Metallocene Catalysts," Macromolecules, 31, pp. 1335-1340, 1998 (6 pages).
Z. Guo et al., "High-Precision Monitoring of Average Molecular Weight of Polyethylene Wax from Waste High-Density Polyethylene," Polymers, 2020, 12, 188, 2020 (16 pages).

(Continued)

*Primary Examiner* — Robert C Boyle
(74) *Attorney, Agent, or Firm* — Osha Bergman Watanabe & Burton LLP

(57) ABSTRACT

A method for producing a low viscosity polyethylene-based composition comprising melting a polyethylene-based composition; decreasing a viscosity of the polyethylene-based composition; and optionally, repeating the melting and the viscosity decreasing steps to form a low viscosity polyethylene-based composition; wherein the melting and viscosity decreasing steps are performed in a continuous process at temperature that is equal to or greater than 350° C., residence time of less than 2 min and the polyethylene-based composition is in the presence of at least one free radical generator.

20 Claims, 16 Drawing Sheets

(56) References Cited

OTHER PUBLICATIONS

A. V. Machado et al., "Monitoring Polyolefin Modification Along the Axis of a Twin Screw Extruder. I. Effect of Peroxide Concentration," Journal of Applied Polymer Science, vol. 81, pp. 58-68. 2001 (12 pages).

A.S. Babetto et al., "Evaluation of the pro-degradant systems in the thermooxidative degradation of HDPE," Polímeros, 25 (número especial), pp. 68-76, 2015 (10 pages).

Office Action issued in U.S. Appl. No. 17/526,593; Dated Nov. 20, 2023 (19 pages).

\* cited by examiner

PROCESSING OF POLYETHYLENE-BASED COMPOSITIONS AND PRODUCTS THEREFROM

BACKGROUND

Polyethylenes are commodity plastics. The account for more than 70% of total plastics market. Polyethylenes are easily available, at relatively low cost and easily processable at temperature in the range 150-250° C. Polyethylenes are thermoplastic in nature and therefore they can be reprocessed repeatedly.

The degradation of polyethylene may broaden the possibilities of products. There are a lot of benefits in being able to breakdown polymers in the decomposition range to produce high value outputs such as polymers with low viscosity (e.g., meltblown applications), functional polymers, oligomers, waxes, oils, etc.

However controlled degradation of polyethylene may be a challenge. Different from other polyolefins like polypropylene and polystyrene, polyethylene when heated generates a competition between degradation (or visbreaking) and crosslinking reactions. When the temperature is about 230° C. or lower, crosslinking reactions are the dominant mechanism. Above 300° C., the degradation reaction becomes dominant. However, the degradation is still not fast enough for usual extrusion process.

Therefore, there is a need for more efficient processes to favor the degradation.

A process to reduce viscosity of polyethylene would be particularly beneficial in the circular economy field as it would broaden the application of post-consumer or post-industrial plastics.

Chemical recycling is an attractive technological pathway for reducing plastic waste. However, these technologies suffer from low energy efficiency and lack of product control, often resulting in the formation of complex product compositions. In addition, chemical recycling routes are the least preferred recycling option in terms of life-cycle analysis (LCA). The lower product yield also makes the economics hard to achieve. Thus, these routes show no attractiveness in terms of technical and economic feasibility.

The extruder can be considered as a pre-reactor to produce outputs with high viscosity decreased (e.g., waxes), providing feedstock to chemical recycling and new upcycling or high-value products to PCR portfolio.

Waxes as feedstock to chemical recycling routes can improve the productivity process, enabling energy benefits for chemical recycling and making to achieve economics hard.

In terms of high value products, waxes are used in a wide variety of applications, for instance. The waxes market was sized at USD 10.03 billion in 2018 and is expected to grow by 3.7% from 2019 to 2025. Besides, following these potential applications, the range of prices for PP and LDPE/LLDPE plastic waste can be increased in approximate value by an order of magnitude of 10 or 50 for these products or other types of upcycling applications.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for producing a low viscosity polyethylene based composition that includes melting a polyethylene-based composition; reducing a viscosity of the polyethylene-based composition; and optionally, repeating the melting and the reducing steps to form a low melt viscosity polyethylene-based composition; wherein the melting and reducing steps are performed in a continuous process at temperature that is equal to or greater than 350° C., reference residence time($t_0$) less than 2 min, and the polyethylene-based composition is in the presence of at least one free radical generator.

The low viscosity polyethylene based-composition prepared according to the present disclosure may be used in many different products, such as waxes, a melt blown compositions, viscosity modifiers, binders, carrier compositions, adhesives, hot melt compositions and as a chemical recycling feedstock.

Other aspects and advantages of the claimed subject matter will be apparent from the following description and the appended claims.

DETAILED DESCRIPTION

Figure 1:
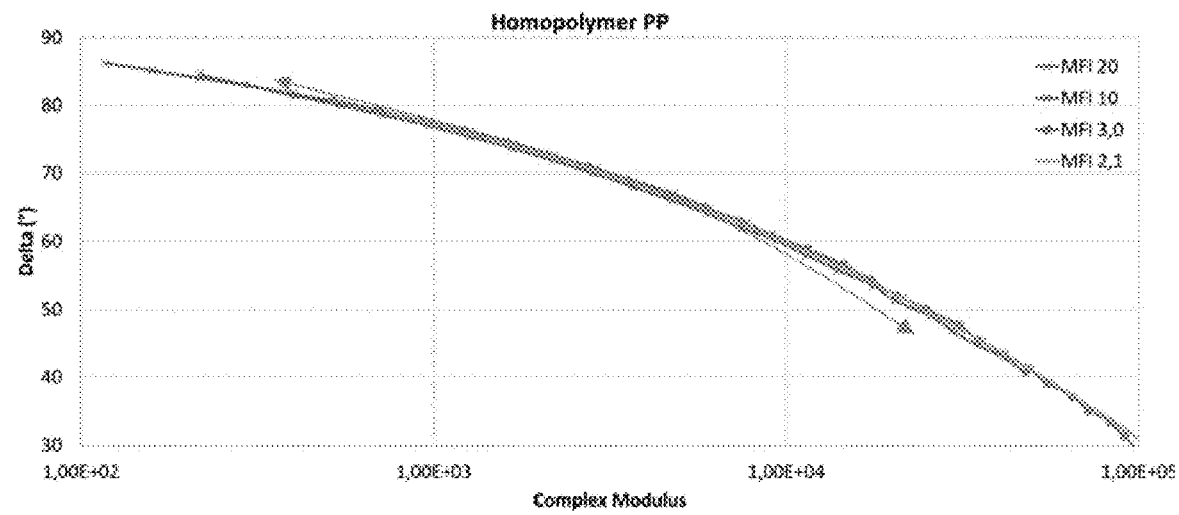
FIG. 1 shows a van Gurp-Palmen graph for polypropylene with different viscosities.

In one aspect, embodiments disclosed herein relate to methods of processing a polyethylene-composition to provide low viscosity polyethylene-based compositions that are useful for several applications, for instance, meltblown applications, chemical recycling processes, among others.

The process according to the present disclosure of reducing viscosity comprises the reduction of the molecular weight of a polyethylene-based composition. Therefore, the viscosity decreases not only by the effect of increasing the temperature, but also by reducing the molecular weight of a polyethylene-based composition.

Polyethylene-Based Compositions

The "polyethylene-based compositions" according to the present disclosure are polymer compositions comprising greater than 50 wt. % of polyethylene resin.

In one or more embodiments, the polyethylene-based composition comprises greater than 97 wt %, 98 wt. %, 99 wt. % or 100 wt. % of polyethylene in its composition based on the polymer content.

In one or more embodiments, the polyethylene-based composition comprises polyethylene resin and a second resin, wherein the second resin is present in an amount having a lower limit of 0.1 wt. %, 5 wt. %, 10 wt. %, 15 wt. %, 20 wt. % or 25 wt. %, and a upper limit of 30 wt. %, 35 wt. %, 40 wt. %, 45 wt. % or 49 wt. %, wherein any lower limit may be combined with any upper limit, wherein the amounts are based on the sum of the polyethylene and the second resin weights. The second resin may be selected from polyamide, nylon, ethylene-vinyl alcohol, polyethylene terephthalate, polypropylenes, polybutylenes, ethylene-vinyl acetate copolymers, polystyrenes, and combinations thereof. In one or more embodiments, the polyethylene-based composition comprises from 5 to 20 wt. % of the second resin, wherein the second resin is selected from polypropylenes, polybutylenes, ethylene-vinyl acetate copolymers, polystyrenes, and combinations thereof.

In one or more embodiments, the polyethylene-based composition comprises from about 5 to about 20 wt. % of polypropylene as the second resin, based on the sum of polyethylene and polypropylene resins weights. When combining polypropylene with the polyethylene resin, the polypropylene may act as a free radical generator, improving the efficiency of the process. Advantageously, this combination may provide an easy and practical solution to improve recyclability of multimaterial samples.

In one or more embodiments, the second resin is intentionally added to the polyethylene-based compositions. In one or more embodiments, when the polyethylene-based composition is a recycled material, the second polymer may be already present due to the nature of the source or recycling process. In this case, the second polymer may also be referred as a "contamination" of the polyethylene recycled material.

The "polyethylene resin" or "PE" according to the present disclosure are polymers comprising greater than 50 wt. % of ethylene monomer. The PE may be a homopolymer, copolymers or mixture thereof. In some embodiments, the copolymers may contain comonomers selected from $C_3$ to $C_{10}$ olefins. In one or more embodiments, the PE may have density varying from 0,810 to 0,960 g/cm$^3$ measured according to ASTM D-792-20: Standard Test Methods for Density and Specific Gravity (Relative Density) of Plastics by Displacement. In one or more embodiments the PE may be a very low density PE, linear low density PE, low density PE, medium density PE, high density PE, and combinations thereof. In one or more embodiments, the PE may have melt flow rate (MFR) varying from 0.01 to 50 g/10 min measure according to ASTM D 1238-20 (190° C./2.16 kg).

In one or more embodiments, the polyethylene resin and olefin-based resins of the present disclosure may be selected from petroleum-based resins, biobased resins and combinations thereof.

In one or more embodiments, the polyethylene resin and olefin-based resins of the present disclosure may be selected from virgin resins, recycled resins and combinations thereof.

In one or more embodiments the polyethylene-based composition may comprise combination of recycled resins, biobased resins and optionally petroleum based resins such that the resulting composition achieves low or neutral carbon emission (or even a carbon uptake).

The recycled resin may comprise one or more selected from a post-consumer resin (PCR) and a post-industrial resin (PIR), including regrind, scraps and defective articles. PCR refers to resins that are recycled after consumer use, whereas PIR refers to resins that are recycled from industrial materials and/or processes (for example, cuttings of materials used in making other articles).

In one or more embodiments of the present disclosure, the recycled resin used may be a PCR that comprises one or more polyolefins. In one or more embodiments, the recycled resin is a recycled material according to ISO 14021. The recycled resin of one or more embodiments may include resins having been used in rigid applications (such as from blow molded articles, including 3D-shaped articles) as well as in flexible applications (such as from films). The recycled resin of one or more embodiments may be of any color, including, but not limited to, black, white, or grey, depending on the color used in the ultimate article. The form of the recycled resin is not particularly limited, and may be one or more of pellets, flakes, and agglomerated films.

In one or more embodiments, the polyethylene-based composition may have a viscosity of 200 to 250,000 Pa·s at 0.1 rad/s at 190° C. prior to the processing method of the present invention. In one or more embodiments, polyethylene-based composition may have a viscosity having a lower limit of any of 200, 300, 500, or 1000 Pa·s at 0.1 rad/s to an upper limit of any of 15,000, 20,000, 50,000, 100,000, 150,000 or 250,000 Pa·s at 0.1 rad/s measured at 190° ° C. according to ASTM: D-4440-15 (Dynamic Mechanical Properties Melt Rheology).

Processing Method Description

The method for producing a low viscosity polyethylene-based according to the present disclosure may comprise the following steps:
melting a polyethylene-based composition;
decreasing a viscosity of the polyethylene-based composition; and
optionally, repeating the melting and the viscosity decreasing steps to form a low melt viscosity polyethylene-based composition;
wherein the melting and viscosity decreasing steps are performed at temperature that is equal to or greater than 350° C., residence time less than 2 min, and the polyethylene is in the presence of at least one free radical generator.

In the present disclosure "decreasing the viscosity" is referring to the effect of reducing the molecular weight of the polyethylene-based composition.

In one or more embodiments, the melting and viscosity decreasing steps are performed at temperature that ranges from preferably 400° C. to 450° C. This temperature may be the temperature set up on the equipment (e.g. extruder).

In one or more embodiments, the melting and viscosity decreasing steps are performed in a residence time that ranges of less than 90 s.

In one or more embodiments, the method for producing a low viscosity polyethylene-based is performed in a continuous process, such as in an extrusion. In one or more embodiments, the method involves melting a polyethylene-based composition in an extruder, decreasing the viscosity of the polyethylene-based composition, and extruding the melt through a die. In accordance with one or more embodiments, the melting and viscosity decreasing may be repeated.

In case an extruder is used, it may be selected from a single-, twin-, or multi-screw extruder, in particular embodiments, a twin-screw extruder is used.

The processes of one or more embodiments of the present disclosure result in the viscosity of the polyethylene-based composition decreasing in the extruder. In one or more embodiments, the process may involve multiple extrusions in series, each of which sequentially reduces the viscosity of the recycled resin. The multiple extrusions may be sequential or not. The processes of one or more embodiments may include one extrusion or more, or two extrusions or more. In embodiments where multiple extrusions are performed, each extrusion may be performed under conditions that are the same as, or different from, one another. In one or more embodiments, the repeated melting and viscosity decreasing steps are performed in a continuous loop system. The "continuous loop system" mean a system wherein the polyethylene-based composition enters in an extrusion, is processed and returned to the same extruder.

In one or more embodiments, the at least one free radical generator may comprise a peroxide. The peroxide of some embodiments may be one or more of the group consisting of 3-hydroxy-1,1-dimethylbutyl peroxyneodecanoate, a-cumyl peroxyneodecanoate, 2-hydroxy-1,1-dimethylbutyl peroxyneoheptanoate a-cumyl peroxyneoheptanoate, t-amyl peroxyneodecanoate, t-butyl peroxyneodecanoate, di(2-ethylhexyl) peroxydicarbonate, di(n-propyl) peroxydicarbonate, di(sec-butyl) peroxydicarbonate, t-butyl peroxyneoheptanoate, t-amyl peroxypivalate, t-butyl peroxypivalate, diisononanoyl peroxide, didodecanoyl peroxide, 3-hydroxy-1, 1-dimethylbutylperoxy-2-ethylhexanoate, didecanoyl peroxide, 2,2'-azobis(isobutyronitrile), di(3-carboxypropionyl) peroxide, 2,5-dimethyl-2,5-di(2-ethylhexanoylperoxy) hexane, dibenzoyl peroxide, t-amylperoxy 2-ethylhexanoate, t-butylperoxy 2-ethylhexanoate, t-butyl peroxyisobutyrate, t-butyl peroxy-(cis-3-carboxy)propenoate, 1,1-di(t-amylperoxy)cyclohexane, 1,1-di(t-butylperoxy)-3,3,5-trimethylcyclohexane, 1,1-di(t-butylperoxy) cyclohexane, OO-t-amyl O-(2-ethylhexyl) monoperoxycarbonate, OO-t-butyl O-isopropyl monoperoxycarbonate, OO-t-butyl O-(2-ethylhexyl) monoperoxycarbonate, polyether tetrakis(t-butylperoxycarbonate), 2,5-dimethyl-2,5-di(benzoylperoxy)hexane, t-amyl peroxyacetate, t-amyl peroxybenzoate, t-butyl peroxyisononanoate, t-butyl peroxyacetate, t-butyl peroxybenzoate, di-t-butyl diperoxyphthalate, 2,2-di(t-butylperoxy)butane, 2,2-di(t-amylperoxy)propane, n-butyl 4,4-di(t-butylperoxy)valerate, ethyl 3,3-di(t-amylperoxy)butyrate, ethyl 3,3-di(t-butylperoxy)butyrate, dicumyl peroxide, a,a'-bis(t-butylperoxy)diisopropylbenzene, 2,5-dimethyl-2,5-di(t-butylperoxy) hexane, di(t-amyl) peroxide, t-butyl a-cumyl peroxide, di(t-butyl) peroxide, 2,5-dimethyl-2,5-di(t-butylperoxy)-3-hexyne, dicetil peroxi-dicarbonato, 3,6,9-triethyl-3,6,9-trimethyl-1,4,7-triperoxonane, tert-butylperoxy 2-ethylhexyl carbonate, tert-butyl-peroxide n-butyl fumarate(benzoate), dimyristoyl peroxydiicarbonate, 3,3,5,7,7-pentamethyl-1,2,4-trioxepane, tert-butyl hydroperoxide, bis(4-t-butylcyclohexyl) peroxydicarbonate, and 1,2,4,5,7,8-hexoxonane,3,6,9-trimethyl-3,6,9-tris(ethyl and propyl derivatives).

In one or more embodiments, the at least one free radical generator may be a low-reactivity organic peroxide. The expression "low-reactivity organic peroxide" is understood to be peroxides that have a 1 hour half-life temperature greater than or equal to 165° C. Some examples include 3,3,5,7,7-Pentamethyl-1,2,4-trioxepane, terc-butyl hydroperoxide, cumyl hidroperoxide, t-amyl hidroperoxide, or any mixtures thereof.

In one or more embodiments, the at least one free radical generator may be added to the polyethylene-based composition in an amount ranging from a lower limit selected from one of about 0.01, 0.1, or 0.2 wt. % to an upper limit selected from one of about 1, 1.25, or 1.5 wt. %, relative to the weight of the polyethylene-based composition, where any lower limit can be used with any upper limit.

In addition to the above, in one or more embodiments at least one further free radical generator may be added to the polyethylene-based composition to accelerate the beta scission reaction catalyzed by the at least on free radical generator. The at least one further free radical generator may be one or more of the group consisting of nitroxide compounds as 2,2,5,5-tetramethyl-1-pyrrolidinyloxy, 3-carboxy-2,2,5,5-tetramethyl-pyrrolidinyloxy, 2,2,6,6-tetramethyl-1-piperidinyloxy, 4-hydroxy-2,2,6,6-tetramethyl-1-piperidinyloxy, 4-methoxy-2,2,6,6-tetramethyl-1-piperidinyloxy, 4-oxo-2,2,6,6-tetramethyl-1-piperidinyloxy, bis-(1-oxyl-2,2,6,6-tetramethylpiperidine-4-yl)sebacate, 2,2,.6,6-tetramethyl-4-hydroxypipe ridine-1-oxyl)monophosphonate, N-tert-butyl-1-diethylphosphono-2,2-dimethyl propyl nitroxide, N-tert-butyl-1-dibenzylphosphono-2, 2-dimethylpropyl nitroxide, N-tert-butyl-1-di(2,2,2-trifluoroethyl)phosphono-2,2dimethylpropyl nitroxide, N-tert-butyl-(1-diethylphosphono)-2-methyl-propyl nitroxide, N-(1-methylethyl)-1-cyclohexyl-1-(diethylphosphono) nitroxide, N-(1-phenylbenzyl)-(1-diethylphosphono)-1-methyl ethylnitroxide, N-phenyl-1-diethylphosphono-2,2-dimethyl propyl nitroxide, N-phenyl-1-diethylphosphono-1-methyl ethyl nitroxide, N-(1-phenyl 2-methyl propyl)-1-diethylphosphono-1-methyl ethyl nitroxide, N-tert-butyl-1-phenyl-2-methyl propyl nitroxide, and N-tert-butyl-1-(2-naphthyl)-2-methyl propyl nitroxide.

In one or more embodiments, the further free radical generator may be added to the polyethylene-based composition in an amount ranging from a lower limit selected from one of about 0.01, 0.1, or 0.2 wt. % to an upper limit selected from one of about 1, 1.25, or 1.5 wt. %, relative to the weight of the polyethylene-based composition, where any lower limit can be used with any upper limit.

In one or more embodiments, the melting and viscosity decreasing steps are performed in the presence of an additive selected from metal salts, such as zinc stearate, tin stearate, iron (II) stearate, iron (III) stearate, cobalt stearate, manganese stearate and any combinations thereof. The use of stearate metal salts may inhibit the crosslinking reactions, allowing better control on the morphology of the polymer to obtain more linear chains. In one or more embodiments, metal salts could be added to the method described herein in a sufficient amount to result in a range from about 10 to 500 ppm of metal in the polyethylene-based composition.

Further possible additives may also be added to the method according to the present disclosure, which include those conventionally known to a person of ordinary skill in the art. Any of the aforementioned additives may be added at any stage of a multiple extrusion process.

In case an extruder is used, the resins, free radical generators and other components, may be added to an extruder, either simultaneously or sequentially, into the main or secondary feeder in the form of powder, granules, or flakes. In one or more embodiments, methods may involve a single extrusion or multiple extrusions.

As mentioned above, the polyethylene-based composition may have a viscosity of 200 to 250,000 Pa·s at 0.1 rad/s at 190° C. prior to the method of the present invention. After the one or more melting and viscosity decreasing steps of the present disclosure, the viscosity may be reduced to achieve a viscosity of less than 200 Pa·s at 0.1 rad/s at 180°C or less than 500 Pa·s at 0.1 rad/s at 140° ° C. Depending on the starting viscosity, desired final viscosity, and therefore extent of viscosity decreasing to achieve such final viscosity, the melting and viscosity decreasing steps may occur multiple times.

The process may further comprise a cleaning step. This step may be particularly useful when the polyethylene-based composition comprises recycled resins. Such a cleaning step may involve one or more of the group consisting of degassing by vacuum, the injection of supercritical $CO_2$, and steam stripping. This cleaning step may further include a filtering step. The filtration may remove larger components (e.g., larger than 30 microns, for example) from the molten polymer. The conditions of the filtration depend upon the identity of the components present in the melted mixture.

The cleaning may be also used to remove volatile (lower molecular weight) components, such as residual peroxide and byproducts generated by the chain scission reaction. Said steps may occur during the melting and decreasing viscosity steps or in a subsequent or preliminary step. Such cleaning step may involve one or more of the group consisting of degassing by vacuum, the injection of supercritical $CO_2$, and steam stripping. In one or more embodiments, the method includes removing at least one of low molecular weight contaminants, byproducts, volatiles, or water, from a resin by exposing it to vacuum.

In one or more embodiments, the resulting product is pelletized.

Applications and Uses

The low viscosity polyethylene-based composition of the present disclosure is suitable for several applications as melt blown, wax, viscosity modifier, carrier compositions, adhesives, hot melt compositions, chemical recycling feedstock, among other applications. Also, the low viscosity polyethylene-based composition may be used in 3D printing applications.

In one or more embodiments, the mentioned applications comprises a low viscosity polyethylene-based composition prepared with polyethylene-based composition comprising recycled resin.

One or more embodiments of the present disclosure relate to meltblowing compositions comprising the low viscosity polyethylene-based composition of the present invention. These compositions may be produced by the aforementioned processes. The meltblowing compositions may be meltblown, using very high velocity air flow to draw a polymer melt extruding from a die, to give meltblown polymer fibers. One or more embodiments of the present disclosure are directed to a meltblown article that comprises a plurality of fibers formed from the low viscosity polyethylene-based compositions.

In one or more embodiments, the low viscosity polyethylene-based compositions that are suitable for meltblowing may have a very low content of residual peroxides. In some embodiments, the low viscosity polymer composition may have a peroxide residue content of less than 1500 ppm.

In one or more embodiments, the low viscosity polyethylene-based compositions that are suitable for meltblowing may have a viscosity of less than 200 Pa·s at 0.1 rad/s at 180ºC or less than 500 Pa·s at 0.1 rad/s at 140° ° C. In one embodiment, the viscosity is in a range from 25 to 500 Pa·s at 0.1 rad/s at 140° C., such as 10 to 200 Pa·s at 0.1 rad/s at 180° ° C.

In accordance with the present disclosure, the following procedure may be applied to measure the viscosities of both the starting material and final product. The viscosity may be measured using a parallel plates geometry with 25 mm of diameter and an operational gap of 1 mm, with a defined stressor strain in the linear viscoelastic regime. A 100 Pa stress or 1% strain may be applied to oscillatory sweep from 0.1 to 625 rad/s. With this procedure, it may be possible to use a single methodology to the measure both the start polyethylene composition's viscosity as well as the low viscosity polyethylene-based compositions obtained.

In one or more embodiments, a melt blown fabric may be formed from a plurality of fibers formed from the low viscosity polyethylene-based compositions described herein. Such melt blown fabric may be nonwoven.

Further, it is also envisioned that the low viscosity polyethylene-based compositions of the present invention may also find applicability as an additive in other polymer compositions, such as when a low viscosity polymer is desired. It is envisioned for example, that the low viscosity polyethylene-based compositions described herein may be used as a viscosity modifier or as a binder or carrier in a high filled compound.

Low viscosity polyethylene-based compositions according to the present disclosure may be used as a viscosity modifier in polymer compositions to be applicable to different molding processes, including processes selected from extrusion molding, coextrusion molding, extrusion coating, injection molding, injection blow molding, inject stretch blow molding, thermoforming, cast film extrusion, blown film extrusion, foaming, extrusion blow-molding, injection stretched blow-molding, rotomolding, pultrusion, calendering, additive manufacturing, lamination, and the like, to produce manufactured articles.

Low viscosity polyethylene-based compositions according to the present disclosure may be used as wax. In case a wax is produced, the low viscosity polyethylene-based compositions may have a viscosity less than 200 Pa·s at 0.1 rad/s at 180° C. In some embodiments, the wax has a molecular weight lower than 37,000 g/mol, preferably from 320 to 37,000 g/mol and a viscosity equal to or lower than 10,000 mPa·s, measured at 140° C. using a rotational viscometer.

Low viscosity polyethylene-based compositions according to the present may also serve as a raw material for chemical recycling processes, such as hydrogenation, hydrocraking, oxycracking, gasification, hydrothermal liquefaction and other suitable known processes. In this case, it is preferred that the low viscosity polyethylene-based compositions is substantially obtained from recycled resins.

EXAMPLES

Description of the Determination Methods

Rheological Measurements

Regular polyolefins present relatively high molecular weight. Those polyolefins usually are rheologically characterized using oscillatory regime in rotational rheometer using 25 mm plates.

To analyze waxes that have very low molecular weight (lower than 37,000 g/mol), different rheological analyses or conditions are needed. Lower temperatures are normally used to compensate the very low viscosities.

(a) Oscillatory Regime

Frequency sweep analysis (0.0628-628 rad/s), oscillatory regime, was carried out in a rotacional rheometer DHR-3—TA Instruments, using a 25 mm Parallel plate geometry, gap of 1 mm, stress of 10 Pa (determined in a previous test to be in the linear viscoelasticity regime) and a soaking time of 60 s.

(b) Steady State Regime

The flow sweep analysis (steady state regime) was carried out in a rotational rheometer DHR-3 TA Instruments, using a 25 mm cone plate geometry, shear rate varying from 0.1 to 1000 s-1 and a soaking time of 60 s.

For both rheological analyses, the temperature used 140° ° C.

(c) Van Gurp-Palmen Analysis

Usually, polyolefins are processed at temperatures lower than 300° C. due to modifications in molar mass and molar mass distribution, that interferes in the final properties. Also, typical equipment has some instrumental limitations to go to high temperatures, with 350° C. being the most common upper limit.

To evaluate the effect of processing on polyolefins it is important consider that, mainly for PE, the process usually generates some crosslinking at a wide range of temperature (180-250° C.), resulting in a more viscous and with a broader MWD material than the starting material, a regular process would present some significant competition between crosslinking reactions and depolymerization (scission reactions). A direct comparison in viscosity normally is not simple because of the effects of elasticity reduction due to the lower viscosity. Thus, a more appropriate way to analyze materials with different viscosity is use the van Gurp-Palmen plot (vGP-plot) which charts the phase angles (delta) versus the absolute values of the complex shear modulus from a rheological oscillatory experiment, where a Delta value near to 0° means higher elasticity and near to 90° more viscous response. The van Gurp-Palmen plot is very useful to characterize different architecture and topology such as polydispersity of linear polymers and long chain branching (LCB). For linear polymers, it is expected to present a unique course in the curve of vGP-plot. For example, if there is no modification (as LCB) in the polymer structure, samples with different viscosity would present overlapped curves in a van Gurp-Palmen graph, as demonstrated for polypropylene in FIG. 1.

Polypropylene from reactor samples presented in FIG. 1 were produced with the same catalyst system, the have the same polymer configuration, no branching, very similar molecular weight distribution. The only difference of those polypropylene samples is the molecular weight; hence the curves present a continue behavior and are overlapped.

Figure 2:
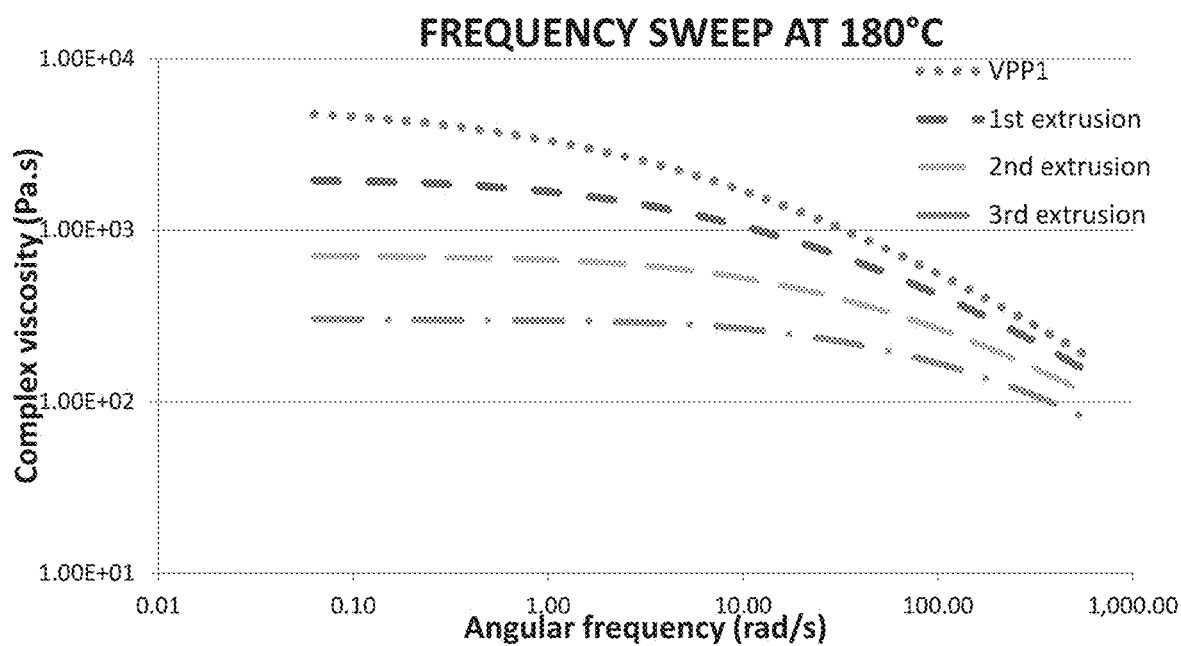
FIG. 2 shows a comparative analysis of Frequency Sweep at 180° C. after multiple extrusion passes for a sample.

Running a polypropylene sample VPP1 at those conditions, viscosity and polydispersity reduction can be observed in each extrusion step, as demonstrated in FIG. 2.

Figure 3:
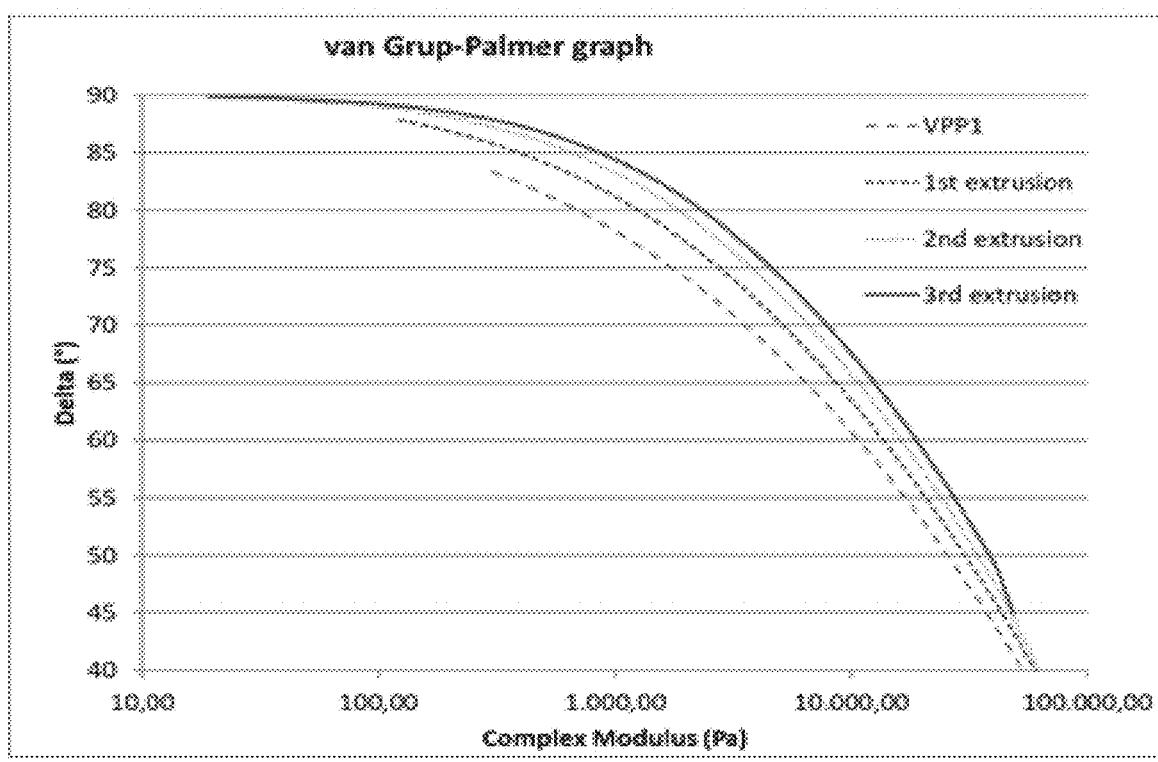
FIG. 3 shows a van Gurp-Palmen graph for a sample after multiple extrusion passes.

The viscosity reduction is observed after each processing, still being in the polymer range viscosity. FIG. 3 shows resulting van Gurp-Palmen graph.

In the vGP plot above it is possible to verify that, when the starting material is compared with the material after each extrusion step, changes in viscosity, molecular weight (x displacement) and also in elasticity and MWD (Y displacement) are being produced. The y displacement seems to be higher than expected probably due some fraction of really low MW molecules, presenting some deviations from what would be expected on usual polymers.

Figure 4:
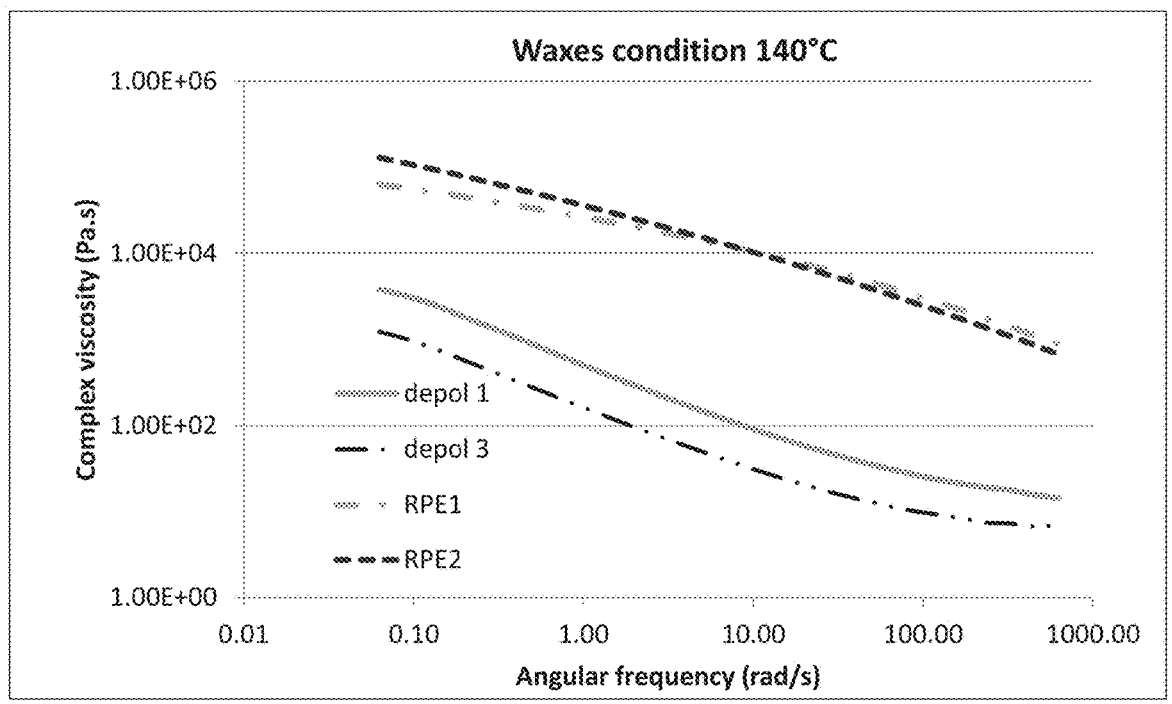
FIG. 4 shows a Frequency Sweep at 180° C. comparing conventional PCR polyethylene and waxes.

Considering the significant decrease in viscosity, waxes were analyzed at a lower temperature)(140° ° C. for polyethylene samples in order to deal with higher viscosity values, adding a better precision on the measurements. According to ASTM D445, waxes are analyzed at 140° C. In FIG. 4, it is possible to see an example to compare conventional PCR PE (RPE1 and RPE2) and waxes (Depol 1 and Depol 3).

As depolymerized samples have a significant low viscosity, oscillatory tests can be no longer feasible, bringing a less precise response to a usual rheological analysis, probably it is no longer a polymer and do not follow entangled chains characteristics.

Figure 5:
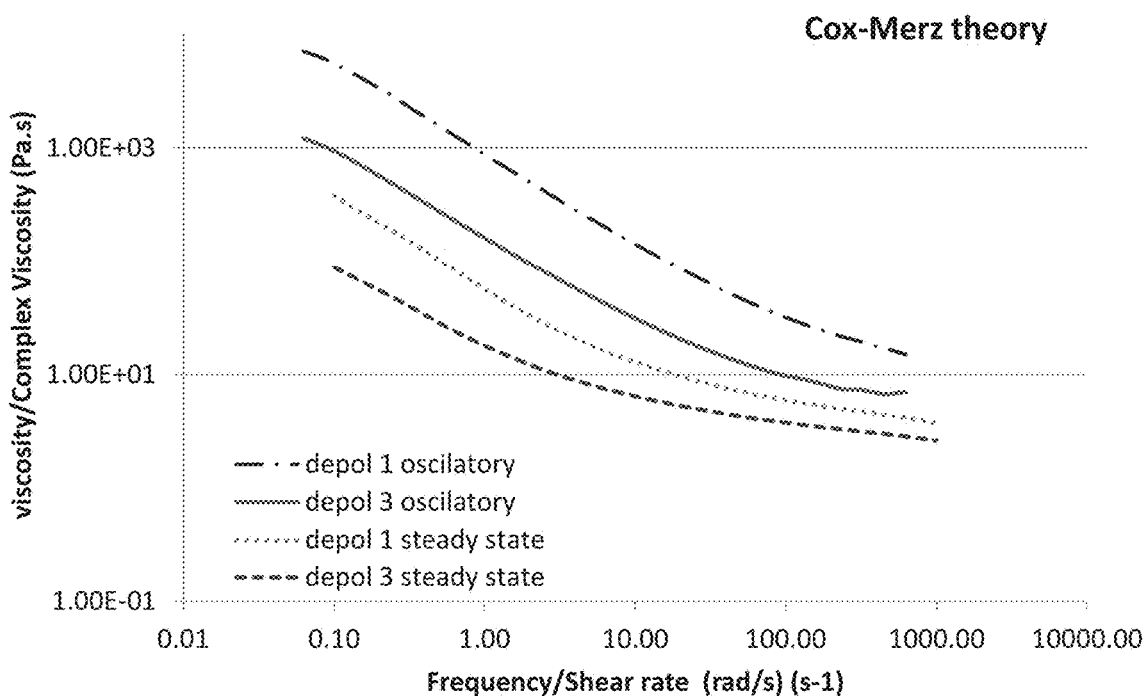
FIG. 5 shows the difference on viscosity and complex viscosity measured for waxes using steady state and oscillatory regimes, respectively.

In this case, steady state measurements can be done to stablish waxes characterization, more similar to the methods usually used to characterize waxes. A theoretical comparison to Cox-Merz approach also shows that the empiric approximation, that is taken as premises to oscillatory tests is no longer valid demonstrating once more that the depolymerized product should be characterized using steady state regime (FIG. 5):

$$\eta(\dot{\gamma}) = |\eta^*(\omega)|_{\omega=\dot{\gamma}}$$

where:

$\eta$ is the viscosity in steady state regime
$\eta^*$ is the complex Viscosity at oscillatory regime
$\omega$ is the frequency at oscillatory regime
$\dot{\gamma}$ is the shear rate FIG. 5 shows the difference in viscosity and complex viscosity measured for waxes using steady state and oscillatory regimes, respectively.

(d) GPC (Gel Permeation Chromatography)

The GPC experiments were carried out in a gel permeation chromatography coupled with an infrared detector IR5 from Polymer Char. It was used a set of 4 column, mixed bed, 13 μm from Tosoh in a temperature of 140° ° C. The conditions of the experiments were: concentration of 0.5 to 1 mg/mL, flow rate of 1 mL/min, dissolution temperature and time of 160° C. and 60 minutes on external oven and followed filtration on external filter system. The injection volume analysis was of 200 μL. The solvent used was TCB (1,2,4-Trichlorobenzene) stabilized with 100 ppm of BHT.

(e) Residence Time $t_0$

Residence time $t_0$ is defined as follow:

In the example below, a twin screw extruder running at 350 rpm and 2 kg/h using a Brabender gravimetric feeder, was fed with polymer and a colored pigment. The exit of the extruder was monitored and recorded. The movie was treated at Tracker software® by the color intensity tracking, resulting in a residence time distribution as represented in FIG. 6.

Figure 6:
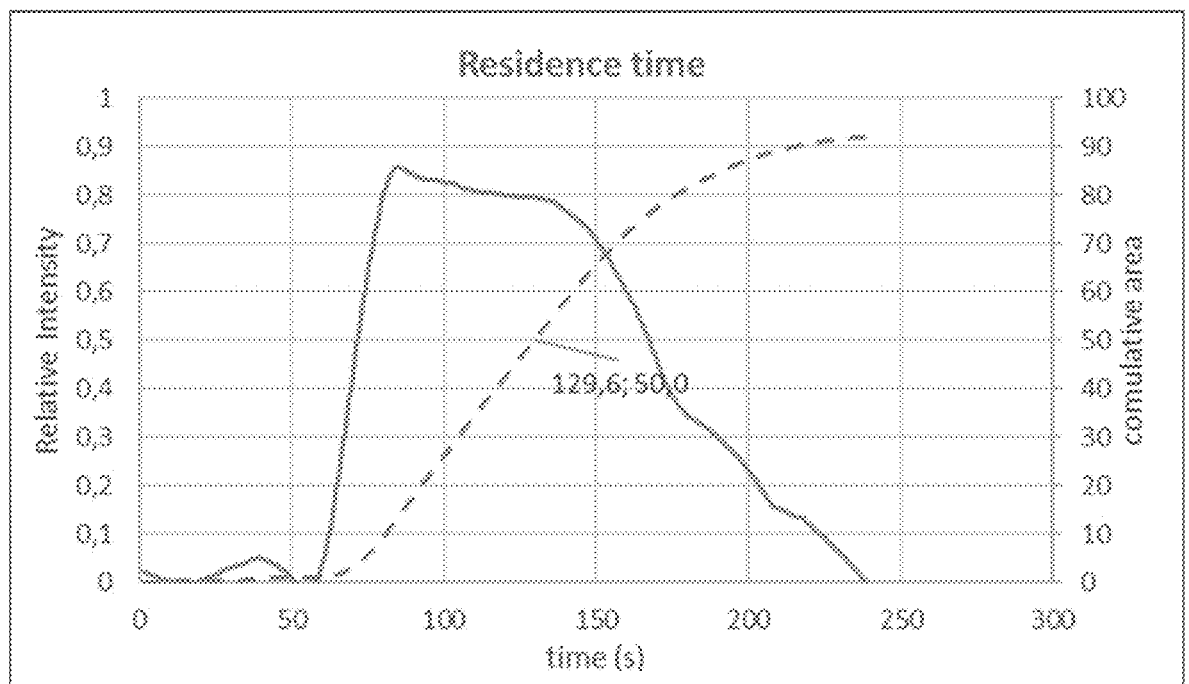
FIG. 6 shows a residence time distribution for an extruded polymer with color pigment.

The initial residence time to was around 60 s, which is a very typical average residence time for many extrusions conditions (FIG. 6).

Figure 7:
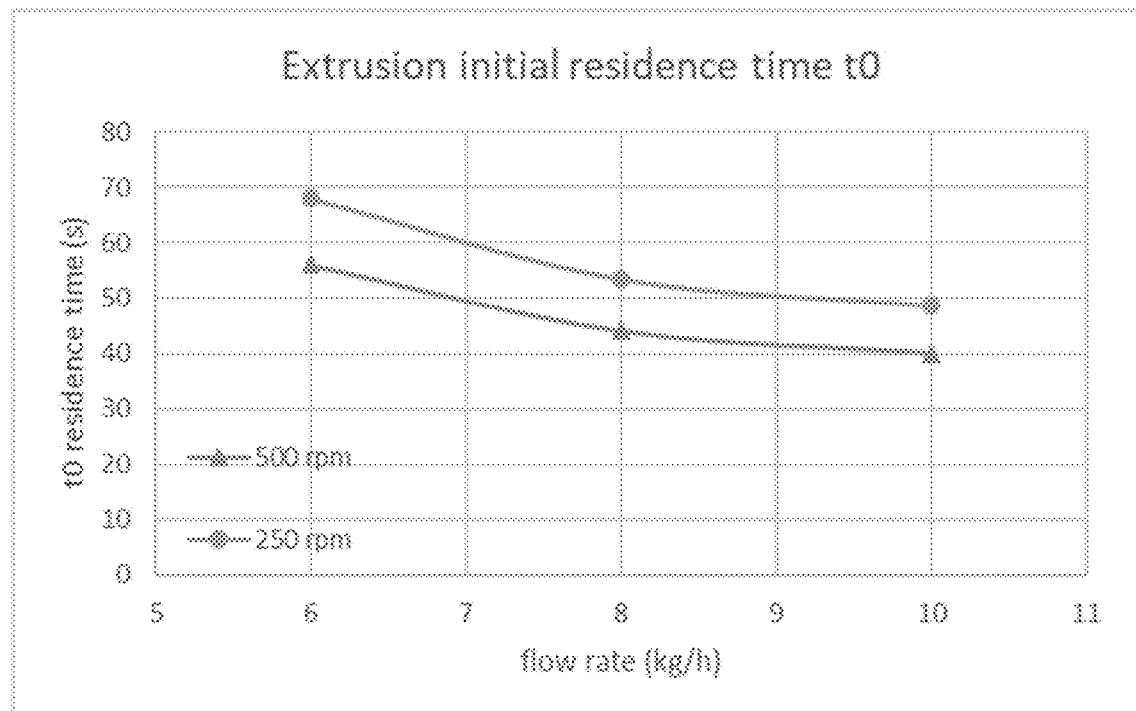
FIG. 7 shows how residence time (t0) varies with extrusion conditions.

Residence time (t0) can vary with the extrusion conditions, as can be seen in FIG. 7, where data for residence time at different flow rate and screw speed is presented. The data was measured in a twin-screw extruder, Coperion ZSK-26, L/D 44 with an appropriated screw profile to work with low viscosity materials, at 450° C. using the method described above. The t0 measured was lower than 2 min for all conditions.

Samples Characterization

Samples used in the following examples are listed in Table 1 below. They were characterized and the results are described below.

TABLE 1

|  | Resin type | Resin Base | MFR (MFI) (g/10 min) | Density (g/cm$^3$) |
|---|---|---|---|---|
| VPE1 | Virgin | LLDPE | 2.0 | 0.920 |
| RPE1 | Recycled | HDPE | 0.3 | 0.960 |
| RPE2 | Recycled | LLDPE | 1.8 | 0.93 |
| VPP1 | Virgin | PP | 10 | 0.900 |
| RPP1 | Recycled | PP copolymer | 15 | 0.915 |

Figure 8:
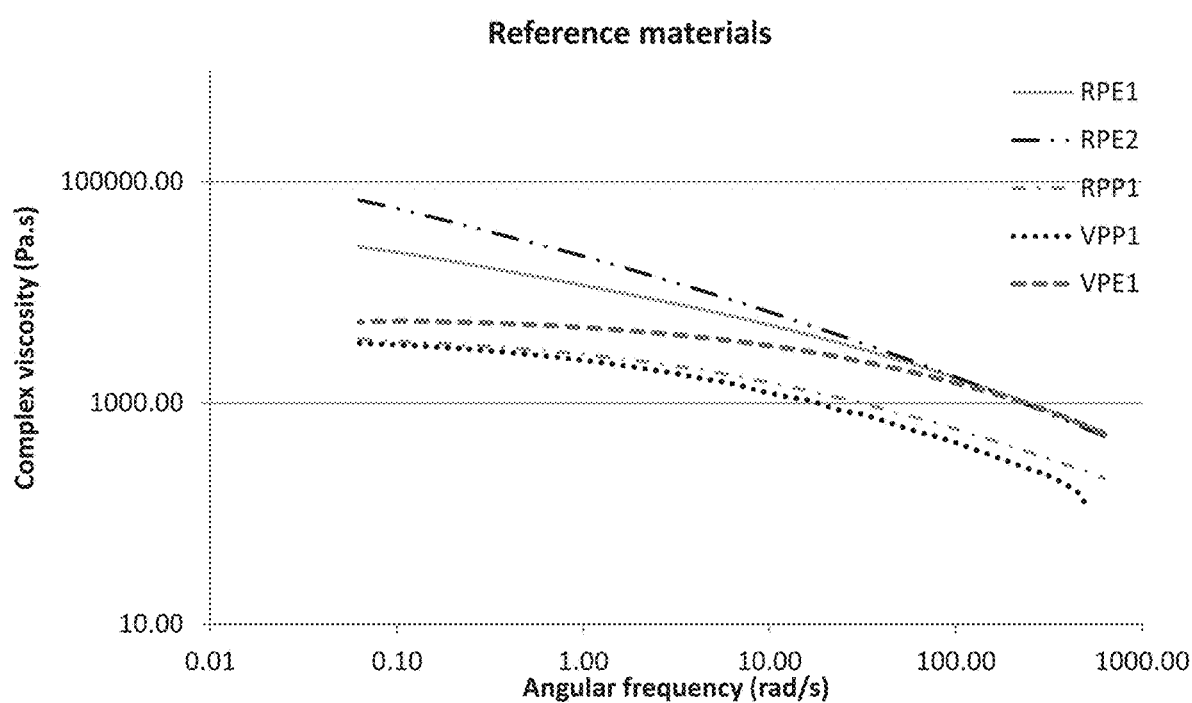
FIG. 8 shows viscosity curves profiles measured in oscillatory regime.

The main objective to the proposed process is to reduce the materials viscosity, generating a wax or low viscosity olefinic material. The viscosity curves profiles measured in oscillatory regime for starting samples are represented in FIG. 8.

Figure 9:
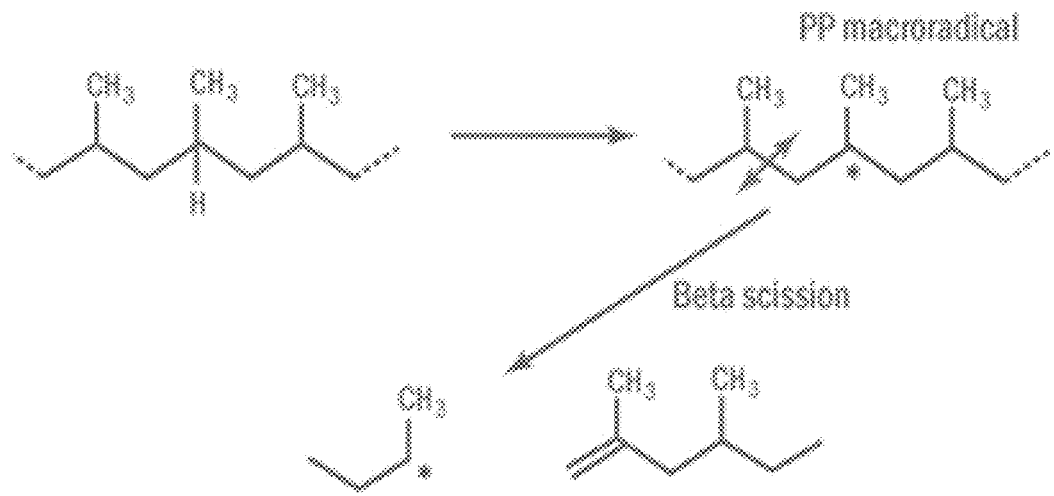
FIG. 9 shows the degradation mechanism for polypropylene.
Figure 10:
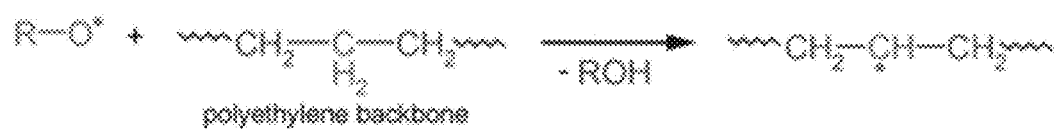
FIG. 10 shows the degradation mechanism for polyethylene.
Figure 10:
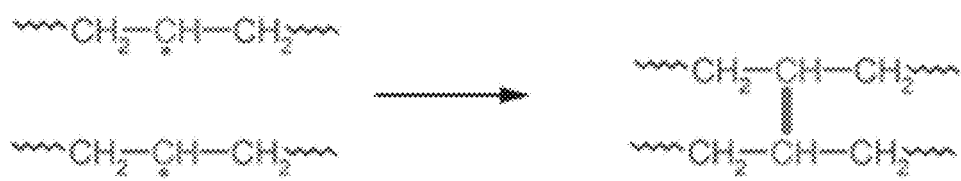

As expected, the virgin PP material (VPP1 and RPP1) presents a higher viscosity at low to medium frequencies and a higher shear thinning behavior than the recycled material, what is explained by scission reactions during the recycling process. The opposite effect is observed at PE resins (VPE1, RPE1, RPE2), where virgin material presents a lower viscosity and a lower shear thinning behavior than recycled material due to some branching produced during the recycling processing steps, which is common to PE. The degradation mechanisms for PP and PE are described in FIG. 9 and FIG. 10, respectively.

Example 1

Figure 11:
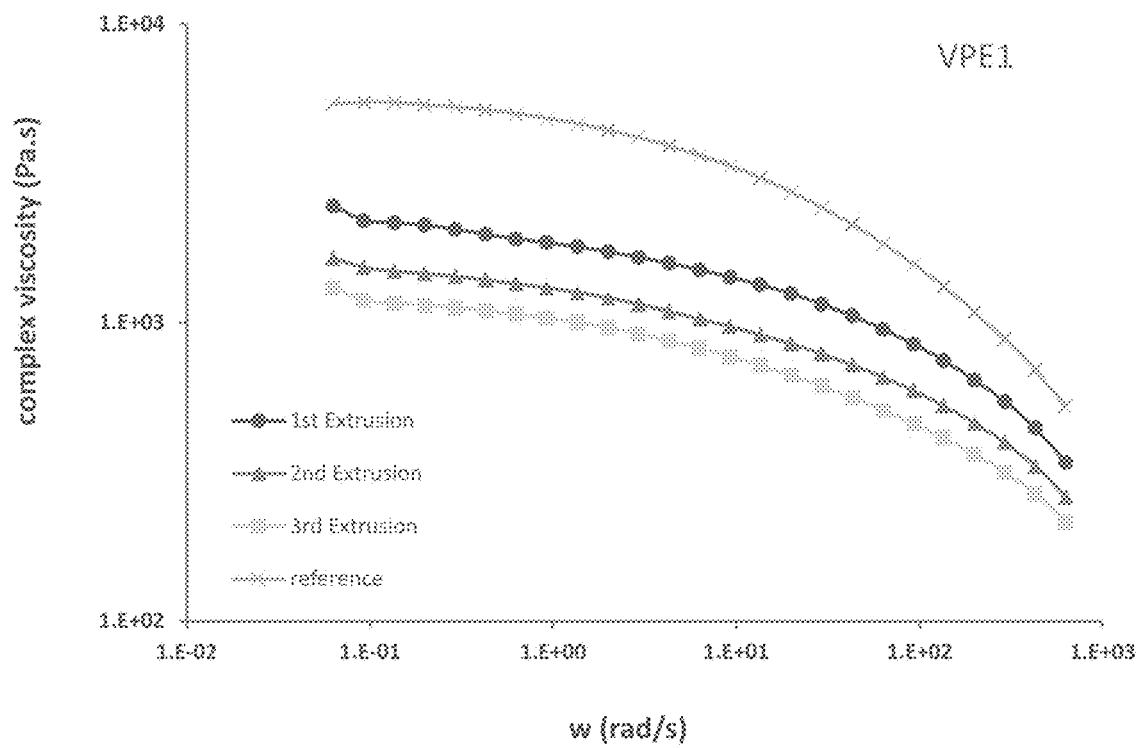
FIG. 11 shows a Frequency Sweep at 180° C. after multiple extrusion passes for a sample.
Figure 12:
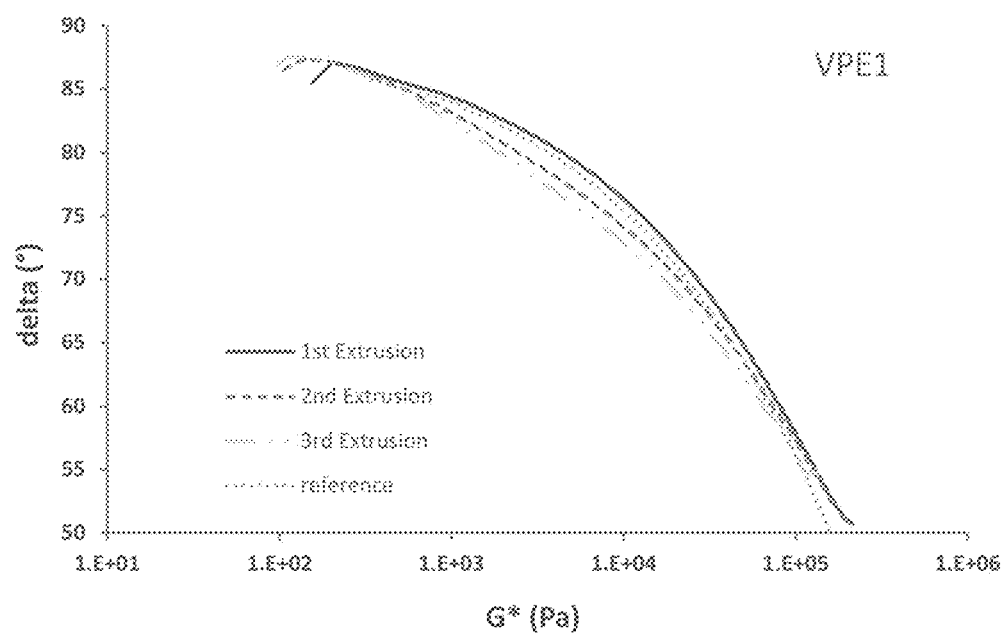
FIG. 12 shows a van Gurp-Palmen graph for a sample after multiple extrusion passes.
Figure 13A:
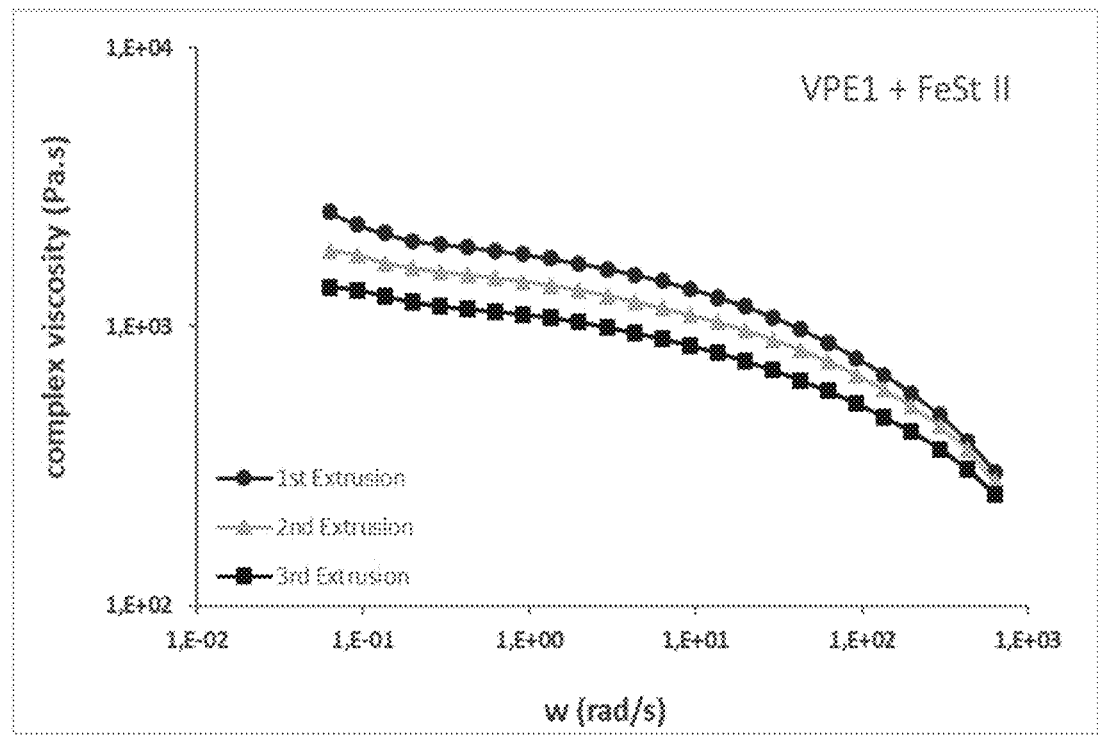
FIGS. 13A and 13B show a Frequency Sweep at 180°C and a van Gurp-Palmen graph, respectively, after multiple extrusion passes for a sample of polyethylene with a chain scission agent.
Figure 13B:
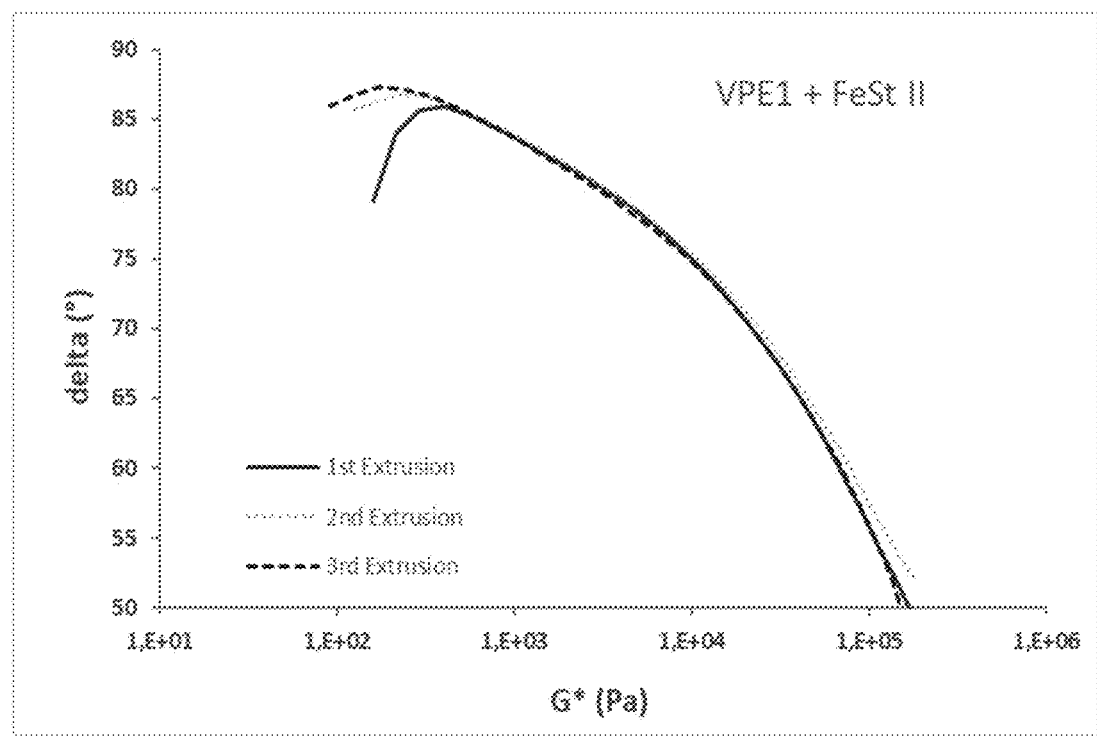
Figure 14A:
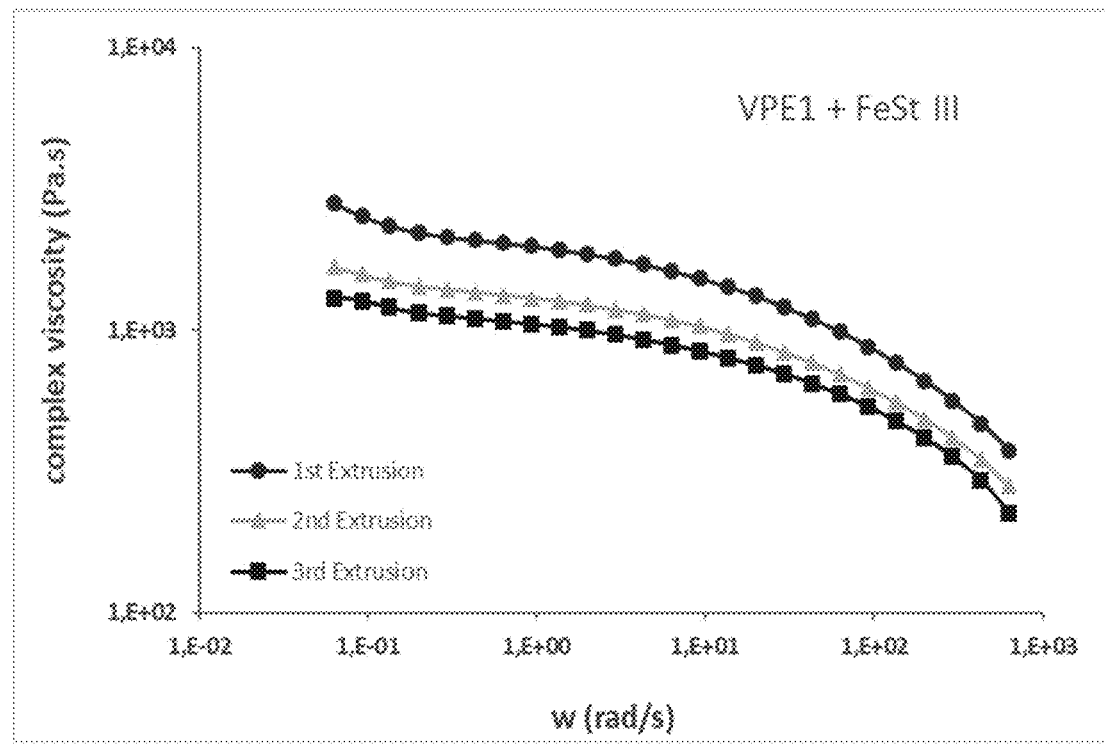
FIGS. 14A and 14B show a Frequency Sweep at 180° C. and a van Gurp-Palmen graph, respectively, after multiple extrusion passes for a sample of polyethylene with a chain scission agent.
Figure 14B:
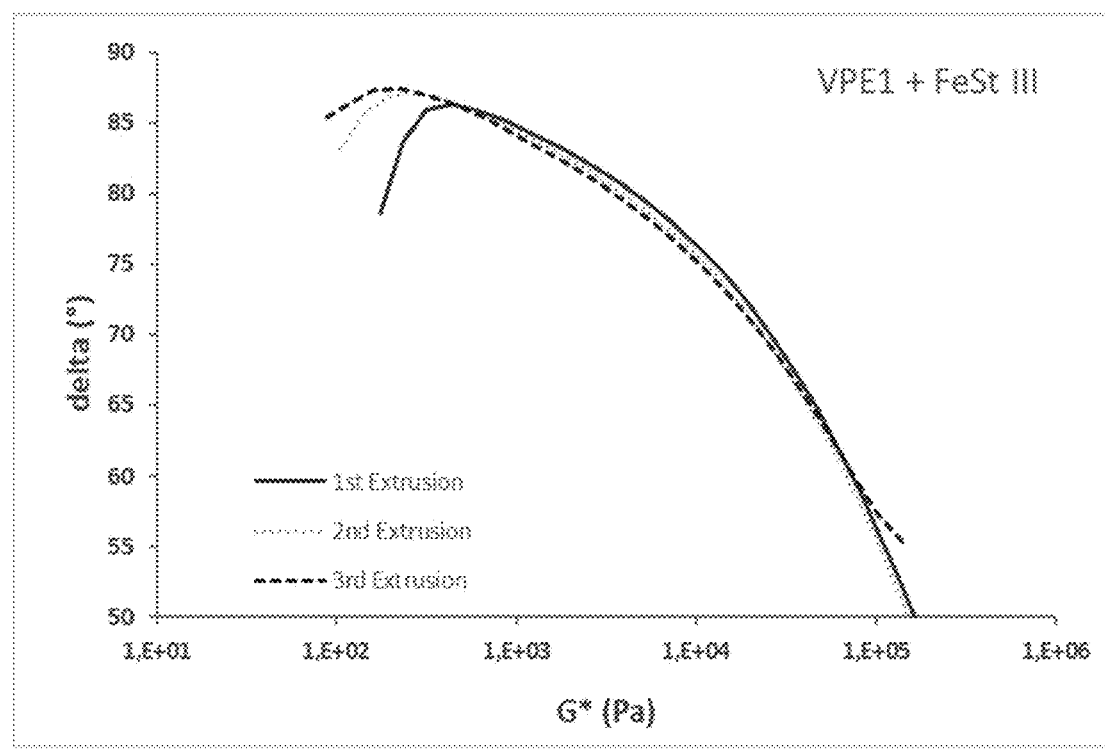
Figure 15A:
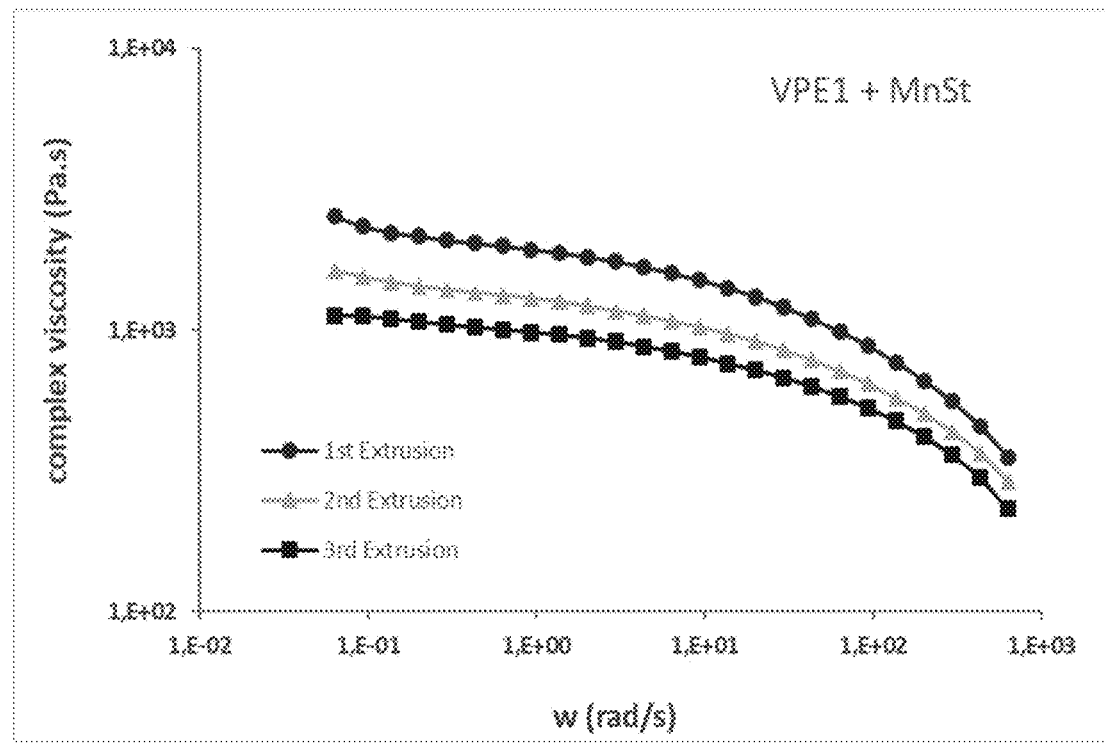
FIGS. 15A and 15B show a Frequency Sweep at 180° C. and a van Gurp-Palmen graph, respectively, after multiple extrusion passes for a sample of polyethylene with a chain scission agent.
Figure 15B:
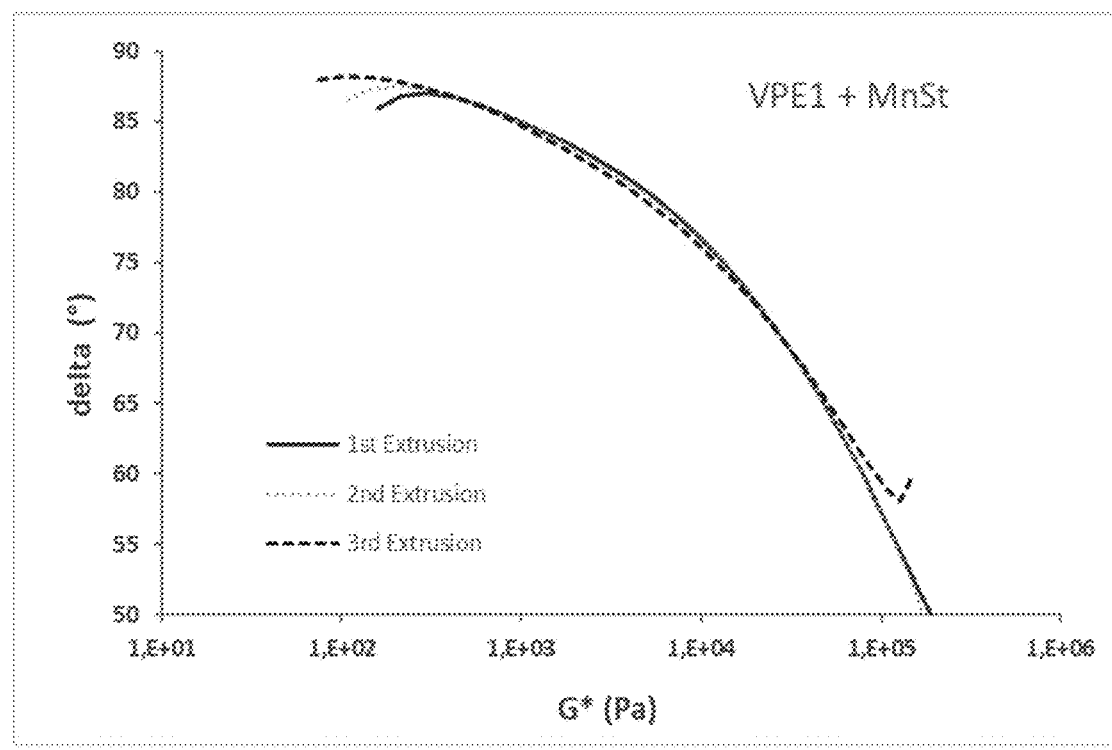
Figure 16A:
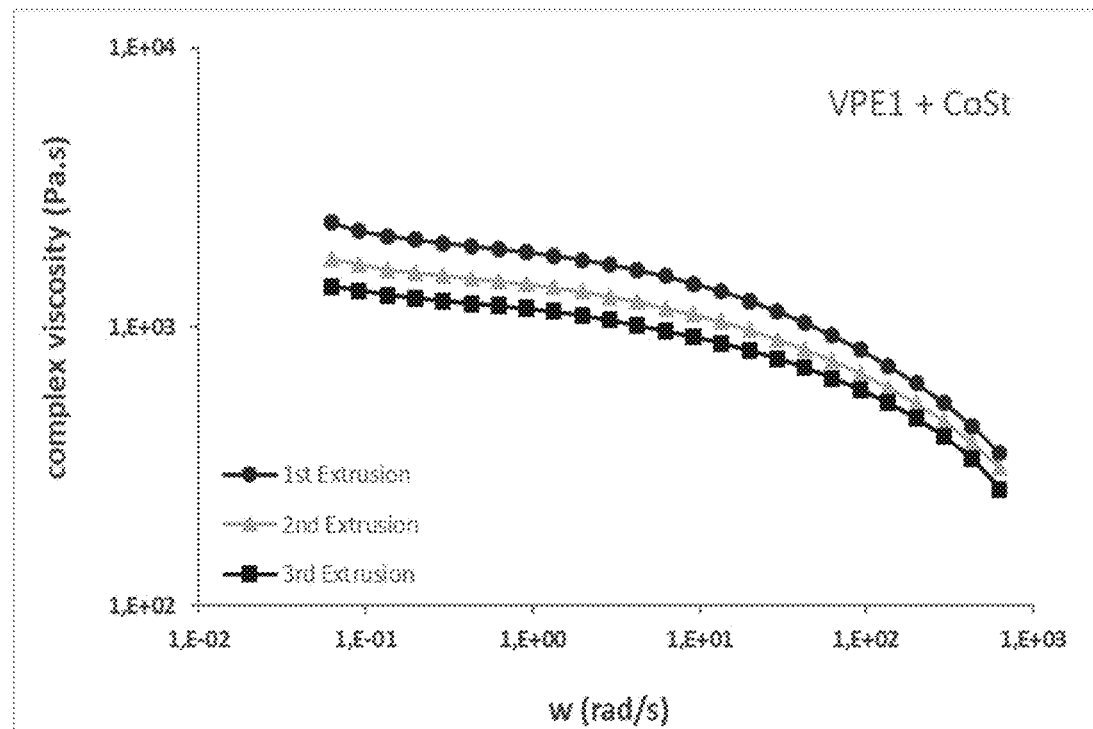
FIGS. 16A and 16B show a Frequency Sweep at 180° C. and a van Gurp-Palmen graph, respectively, after multiple extrusion passes for a sample of polyethylene with a chain scission agent.
Figure 16B:
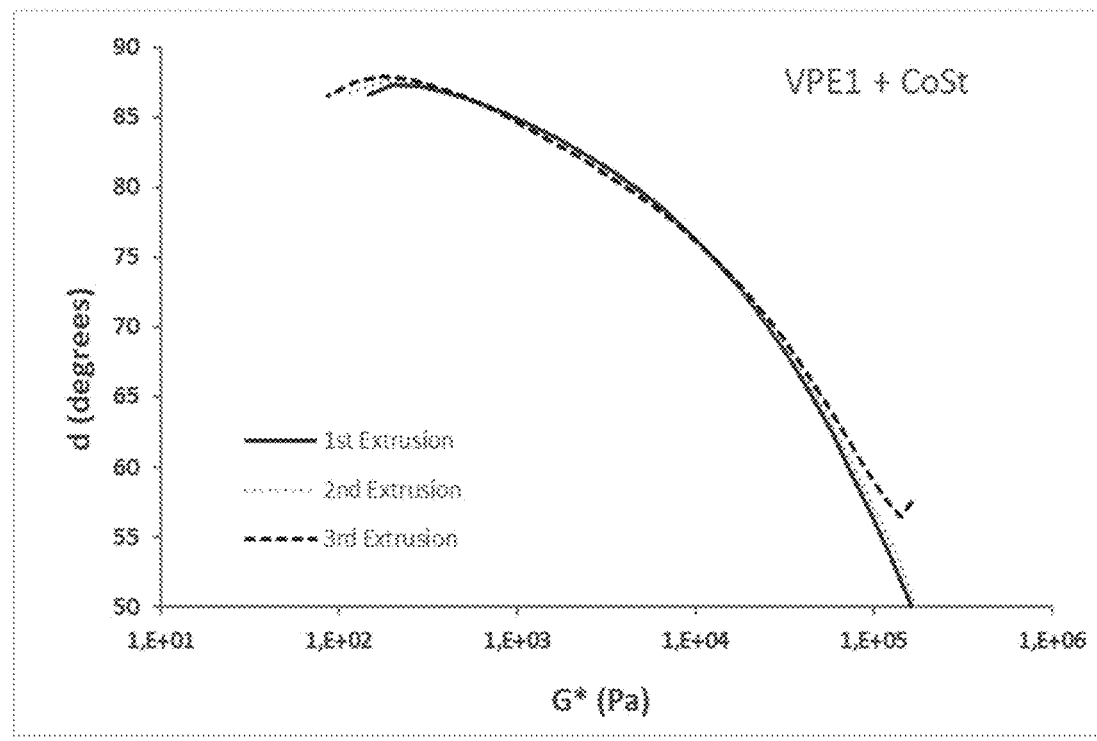
Figure 17A:
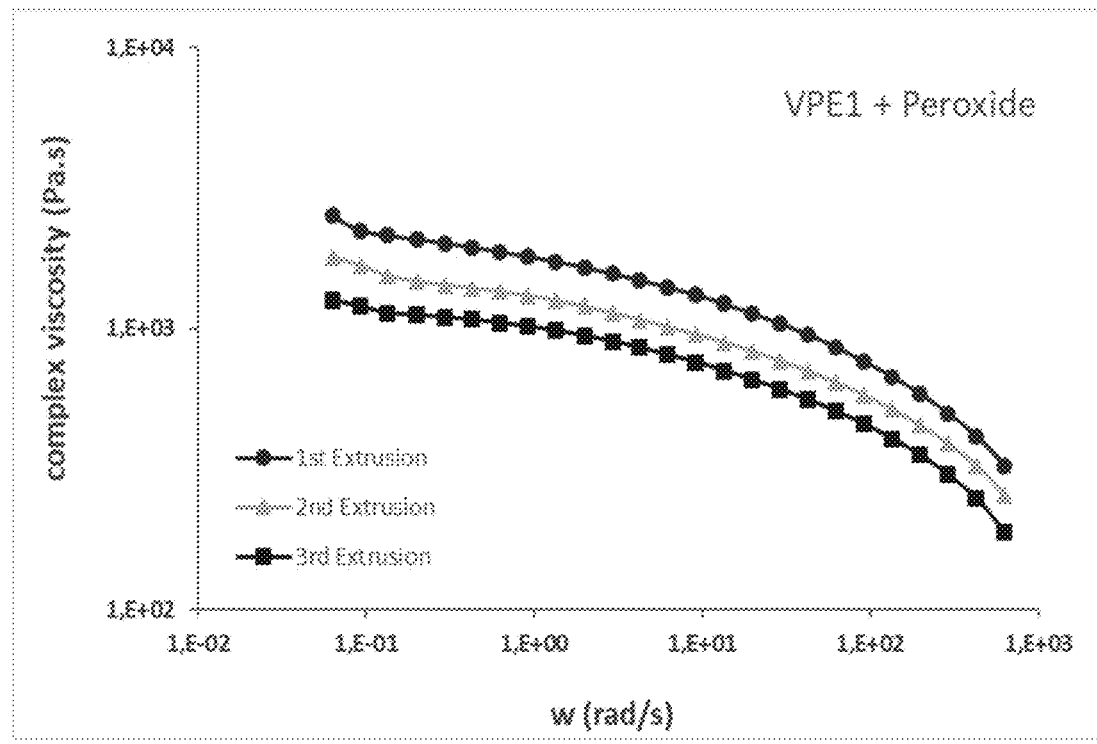
FIGS. 17A and 17B show a Frequency Sweep at 180° C. and a van Gurp-Palmen graph, respectively, after multiple extrusion passes for a sample of polyethylene with a chain scission agent.
Figure 17B:
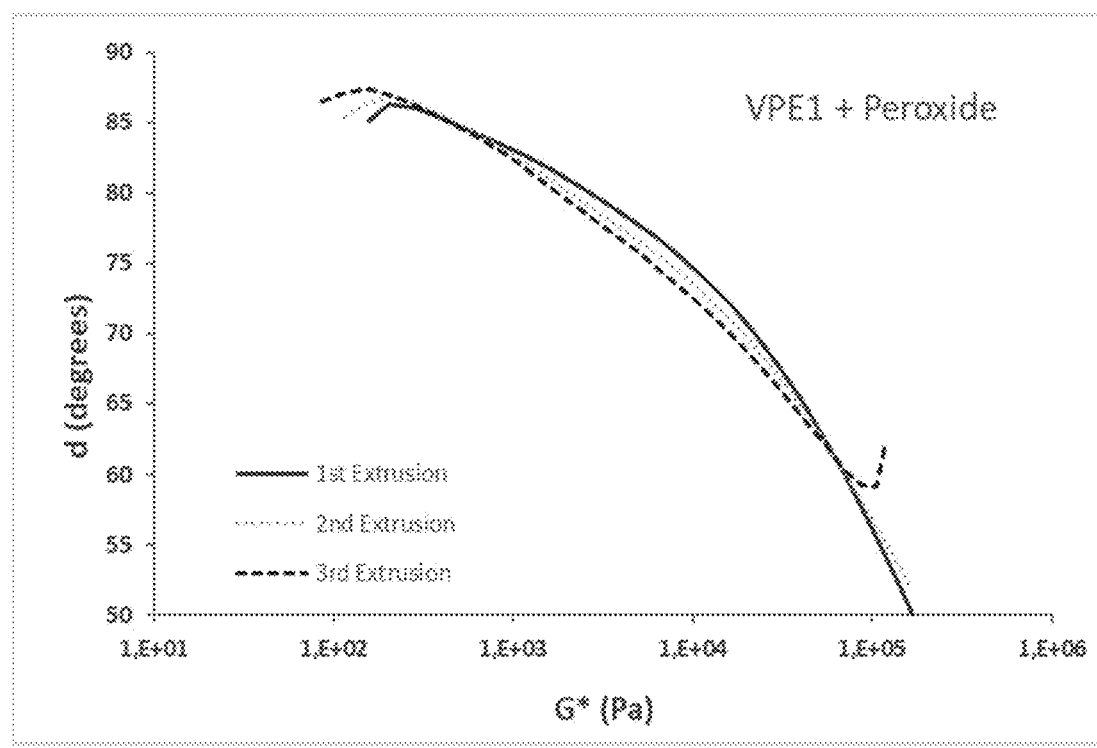

The samples used in this example were run in a twin-screw extruder Brabender TwinLab-C, diameter of 20 mm and L/D 40, using a temperature profile to reach 350° C. before the middle of the extruder, at 2 kg/h using a Brabender gravimetric feeder, resulting in an initial residence time of 60 s. The results, shown in FIGS. 11 and 12, demonstrated that there is a decrease in viscosity of PE at the tested temperature, different from what is usually seem for PE degraded at low temperature. Measurements at 190° C.

The viscosity reduction after each extrusion is observed, however the behavior is still being characteristic of polymers and not of waxes.

Using van Gurp-Palmen plot, it is possible to evaluate that the sample has a mixture of crosslinking and degraded material due the changes in the curve. If only degradation was present, the curve would be overlapped and not observed reduction in the angle at the same complex modulus, indicating an increase of elastic response with the multiple extrusion steps. The reference resin presents less elasticity when comparing to the extruded samples, which may indicate formation of crosslink, characteristic of PE degradation.

The same procedure was performed for VPE1 adding different chain scission agents, as shown in Table 2. The chain scission agents were added in the first extrusion step.

TABLE 2

| Base resin | Aditivation |
|---|---|
| VPE1 | 40 ppm FeSt(II) |
| VPE1 | 40 ppm FeSt(III) |
| VPE1 | 1600 ppm TAHP |
| VPE1 | 40 ppm MnSt |
| VPE1 | 40 ppm CoSt |

Using all additives listed at same condition and procedures, similar behavior in terms of viscosity of the sample without additives but with suppression of the crosslinked units as can be seen in vGP-plot was observed. Results presented in FIGS. 13A-13B, 14A-14B, 15A-15B, 16A-16B, and 17A-17B for the various additives were measured at 190° C.

Example 2

In this example, a very aggressive extrusion process was applied in order to transform the polymers in waxes (shown in Table 3 below) by thermal and mechanical actions. Initially, a twin-screw extruder was used, a Coperion ZSK-26, L/D 44 with an appropriated screw profile to work with low viscosity materials, at 450° C., 10 kg/h and 500 rpm.

TABLE 3

| Sample | Base resin |
|---|---|
| Depol 1 | RPE1 |
| Depol 3 | RPE2 |

Figure 18:
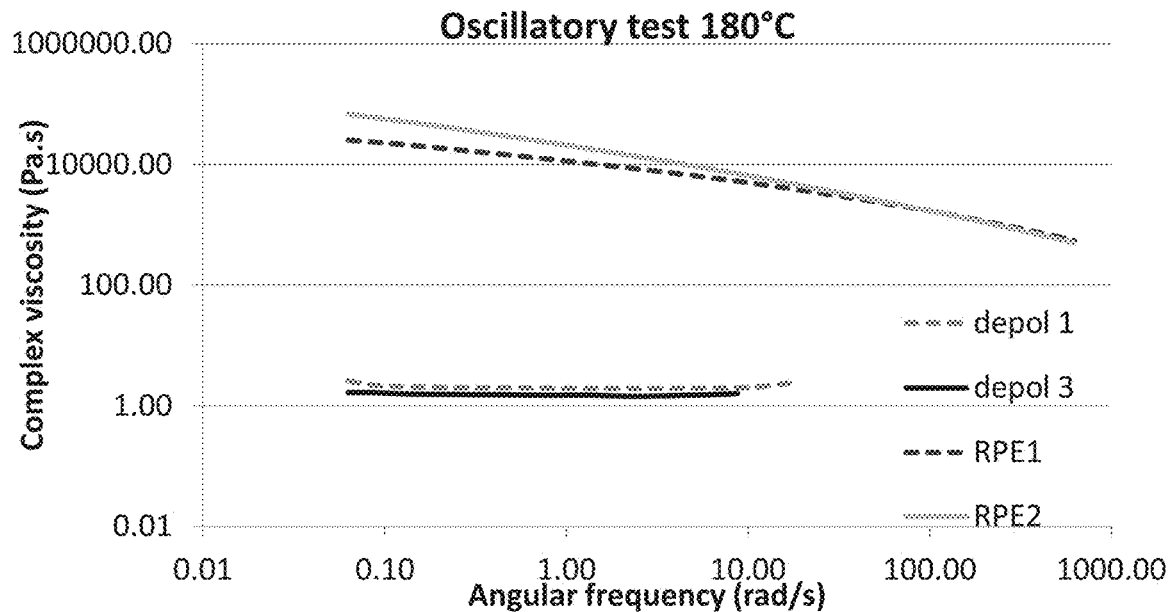
FIG. 18 shows a Frequency Sweep at 180° C. for several samples, showing a viscosity reduction.

The described process results in an important viscosity reduction, as can be observed in FIG. 18, reducing the viscosity of the polymers by more than 1000×.

Figure 19:
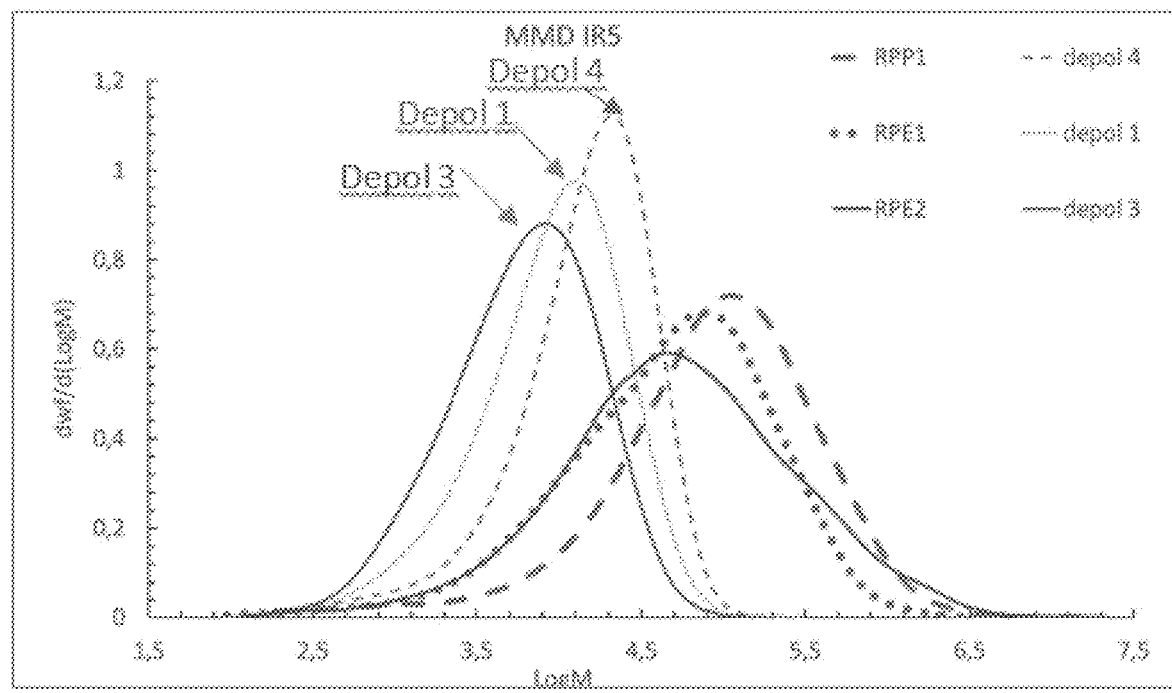
FIG. 19 shows GPC curves for depolymerized resins.

Analyzing GPC curves of the depolymerized resins, the results are presented in FIG. 19 and Table 4 below.

TABLE 4

| IR5 | RPE2 | depol 1 | RPE1 | depol 3 |
|---|---|---|---|---|
| Mw (g/mol) | 128,900 | 13,600 | 187,200 | 9,600 |
| Mn (g/mol) | 23,600 | 4,400 | 12,300 | 3,300 |

TABLE 4-continued

| | IR5 | RPE2 | depol 1 | RPE1 | depol 3 |
|---|---|---|---|---|---|
| Mw/Mn | | 5.45 | 3.13 | 15.27 | 2.91 |
| Mz (g/mol) | | 487,000 | 25,900 | 1,448,100 | 20,600 |
| Mz1 (g/mol) | | 1,729,700 | 41,000 | 5,513,900 | 37,300 |
| IV (dL/g) | | 1.958 | 0.406 | 2.308 | 0.313 |

Analyzing the GPC results, it is possible to confirm that technically the samples are waxes, with a significant reduction in molecular weight and in the molecular weight distribution.

Example 3

The same extrusion conditions used in Example 1 were used here: twin-screw extruder was used, a Coperion ZSK-26, L/D 44 with an appropriated screw profile to work with low viscosity materials, at 450° C., 10 kg/h and 500 rpm.

Sample VPE1 was depolymerized in the presence of different additives. Table 5 below shows the additives and amounts.

TABLE 5

| Sample | Base resin | Additive | Concentration |
|---|---|---|---|
| Depol 1 | VPE1 | — | — |
| Depol 2 | VPE1 | FeSt(II) | 40 ppm Fe(II) |
| Depol 5 | VPE1 | FeSt(II) | 200 ppm Fe(II) |
| Depol 6 | VPE1 | FeSt(III) | 40 ppm Fe(III) |
| Depol 7 | VPE1 | TAHP | 1600 ppm TAHP |
| Depol 8 | VPE1 | MnSt | 40 ppm Mn |
| Depol 9 | VPE1 | CoSt | 40 ppm Co |

* TAHP = tert-amyl hydroperoxide

Figure 20:
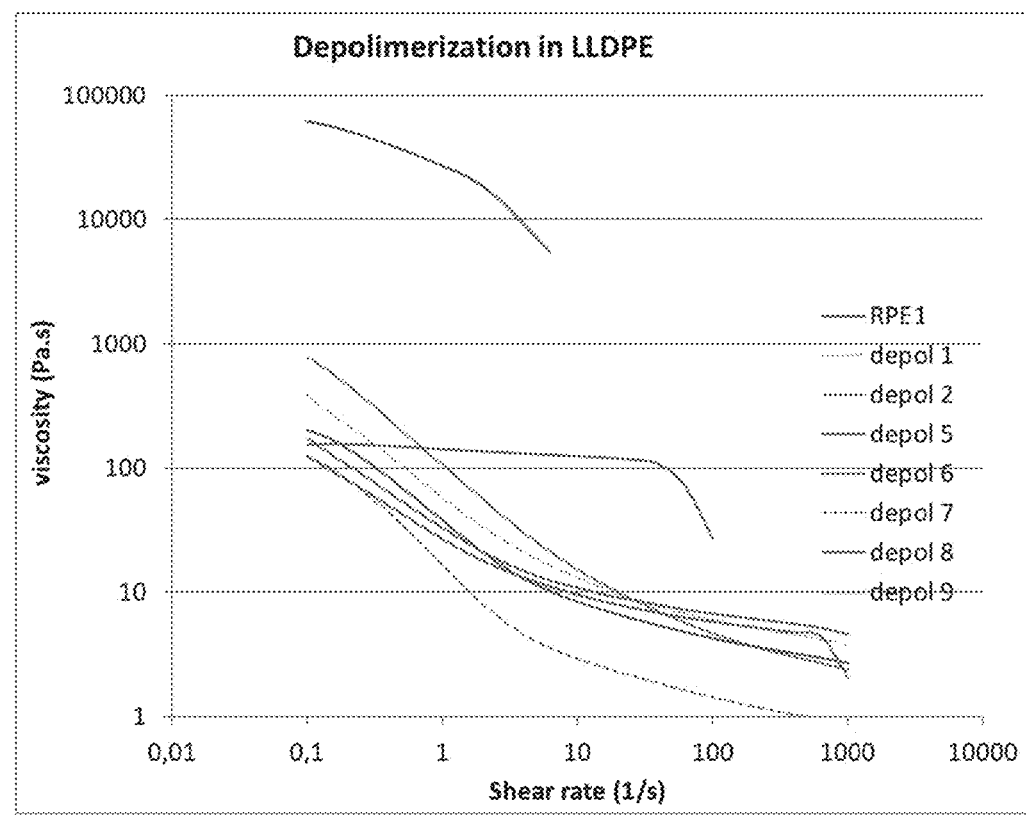
FIG. 20 shows rheology results for several samples, showing a viscosity reduction.

The depolymerization process used brought an important viscosity decreasing, shown in FIG. 20. Depolymerized samples showed a similar behavior. Particular attention is given to sample Depol 7, which presented the lowest viscosity among those samples.

Figure 21:
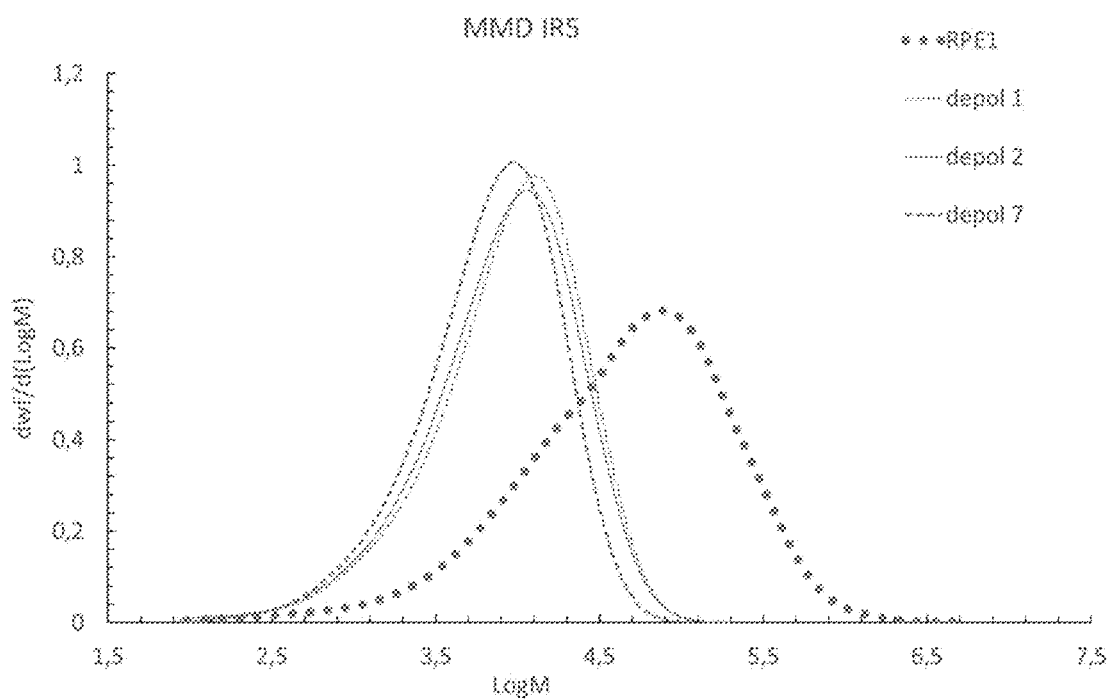
FIG. 21 shows GPC curves for depolymerized resins.

Analyzing GPC curves of the depolymerized resins, the results are presented in FIG. 21 and Table 6 below.

TABLE 6

| | IR5 | RPE1 | depol 1 | Depol2 | depol 7 |
|---|---|---|---|---|---|
| Mw (g/mol) | 128,900 | 13,600 | 12,800 | 10,100 | |
| Mn (g/mol) | 23,600 | 4,400 | 3,700 | 3,800 | |
| Mw/Mn | 5.45 | 3.13 | 3.43 | 2.68 | |
| Mz (g/mol) | 487,000 | 25,900 | 25,300 | 18,300 | |
| Mz1 (g/mol) | 1,729,700 | 41,000 | 41,400 | 28,000 | |
| IV (dL/g) | 1.958 | 0.406 | 0.386 | 0.3282 | |

GPC indicates that it was possible to reach lower molar mass and narrow polydispersity with depolymerization process in all samples, but the decrease in Mw, Mz and Mz1 are more important in the sample with TAHP.

Example 4

Recycled PE sample (RPE1) was contaminated with some amount of PP in order to verify if the lower energy degradation mechanism of PP could have some synergy with the degradation of PE through the free radical generated in this process.

Sample descriptions are in Table 7 below:

TABLE 7

| Sample | Base resin | Aditivation |
|---|---|---|
| Depol 1 | RPE1 | — |
| Depol 7 | RPE1 | peroxide |
| Depol 12 | RPE1 + 10% RPP1 | — |

Figure 22:
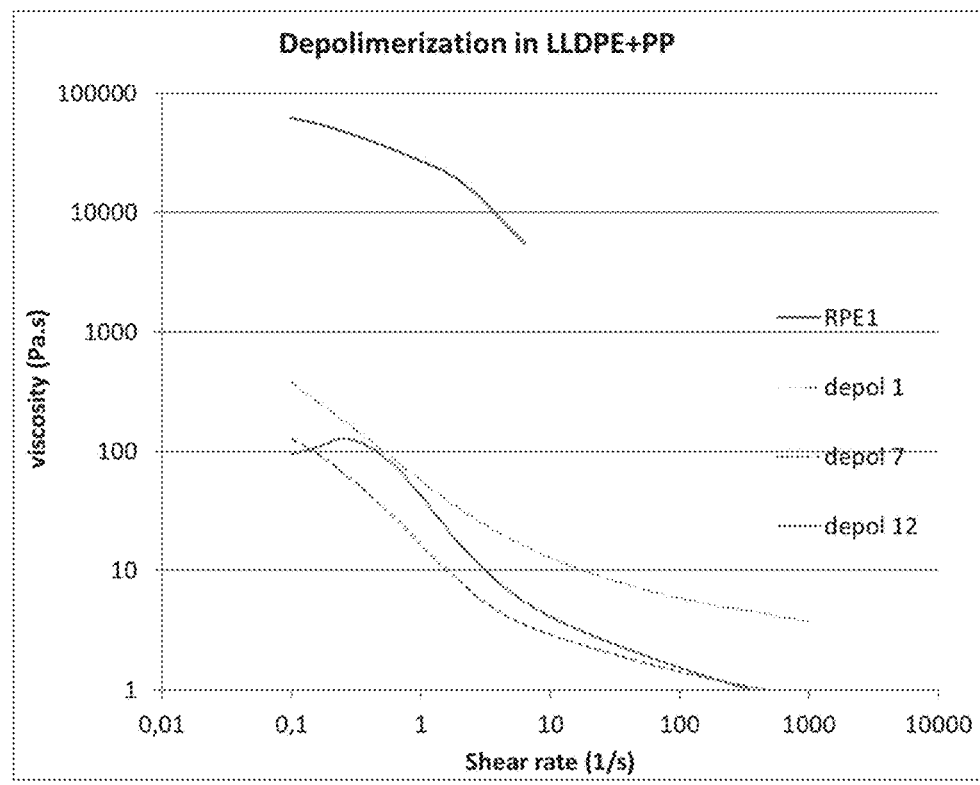
FIG. 22 shows rheology results for several samples, showing a viscosity reduction.
Figure 23:
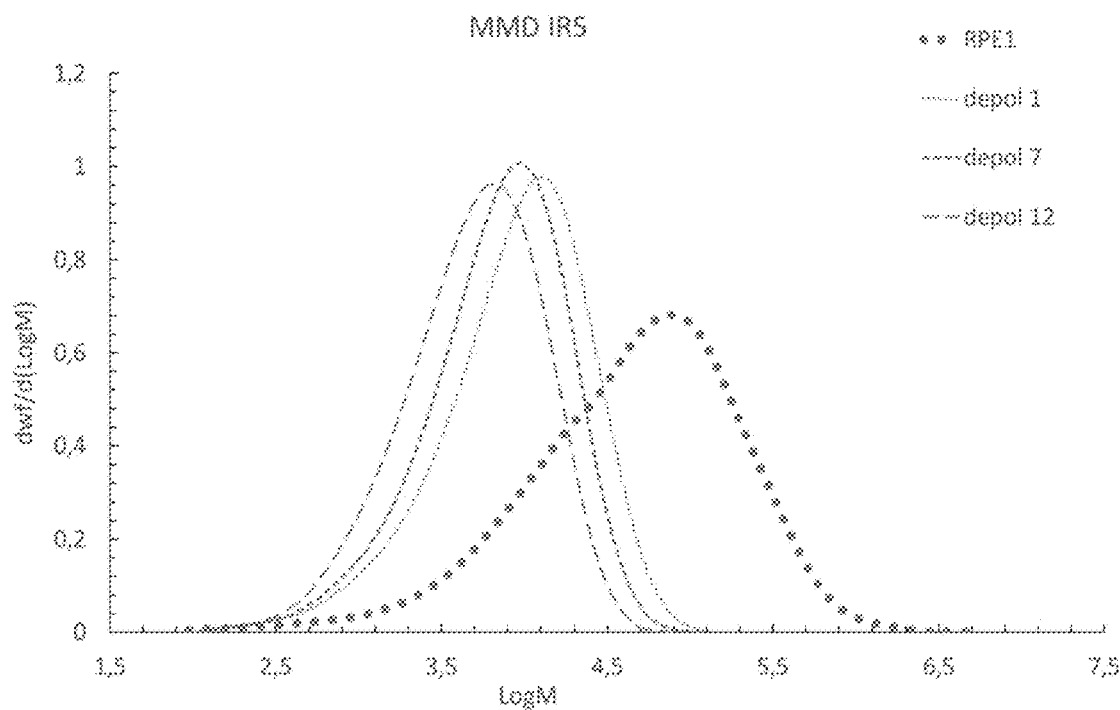
FIG. 23 shows GPC curves for depolymerized resins.

The Rheology is shown in FIG. 22, and GPC analysis is shown in Table 8 and FIG. 23.

TABLE 8

| IR5 | Depol 1 | Depol 7 | Depol 12 |
|---|---|---|---|
| Mw (g/mol) | 13,600 | 10,100 | 7,200 |
| Mn (g/mol) | 4,400 | 3,800 | 2,800 |
| Mw/Mn | 3.13 | 2.68 | 2.55 |
| Mz (g/mol) | 25,900 | 18,300 | 13,300 |
| Mz1 (g/mol) | 41,000 | 28,000 | 20,300 |
| IV (dL/g) | 0.406 | 0.3282 | 0.258 |

When contaminating the sample with some PP, the PP acts as a free radical generator, being an easy and practical solution to improve recyclability of multimaterial samples by chemical recycling using extrusion depolymerizing as pre-process.

Example 5

Figure 24:
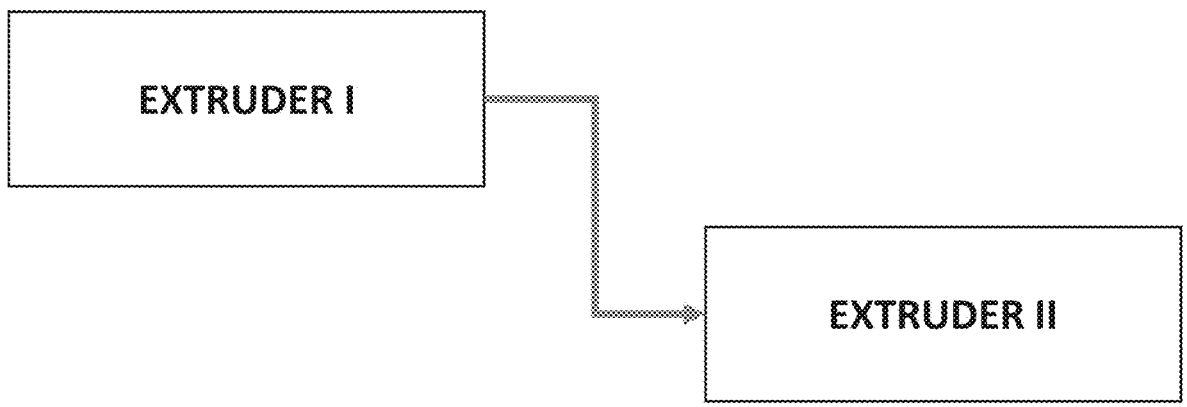
FIG. 24 shows an arrangement of cascading extruders.

Considering that not all extruders can operate at temperatures as high as 450° C., another possibility was tested to generate degradation/depolymerization, considering the relationship between time and temperature. It is possible to operate the equipment at a lower temperature in a cascade configuration, as shown in FIG. 24.

In order to evaluate the arrangement, some samples, shown in Table 9, were run at 400° ° C. twice to observe the depolymerization effects. The tests were performed in a ZSK-26, L/D 44.

TABLE 9

| | Base resin | Aditivation | Extrusion conditions |
|---|---|---|---|
| Depol 14 | RPE1 | — | 10 kg/h, 500 rpm, t0 = 40 s |
| Depol 16 | RPE1 | 40 ppm FeSt(II) | 10 kg/h, 500 rpm, t0 = 40 s |
| Depol 20 | RPE1 | — | 8 kg/h, 500 rpm, t0 = 45 s |
| Depol 21 | RPE1 | | 6 kg/h, 500 rpm, t0 = 55 s |

Figure 25:
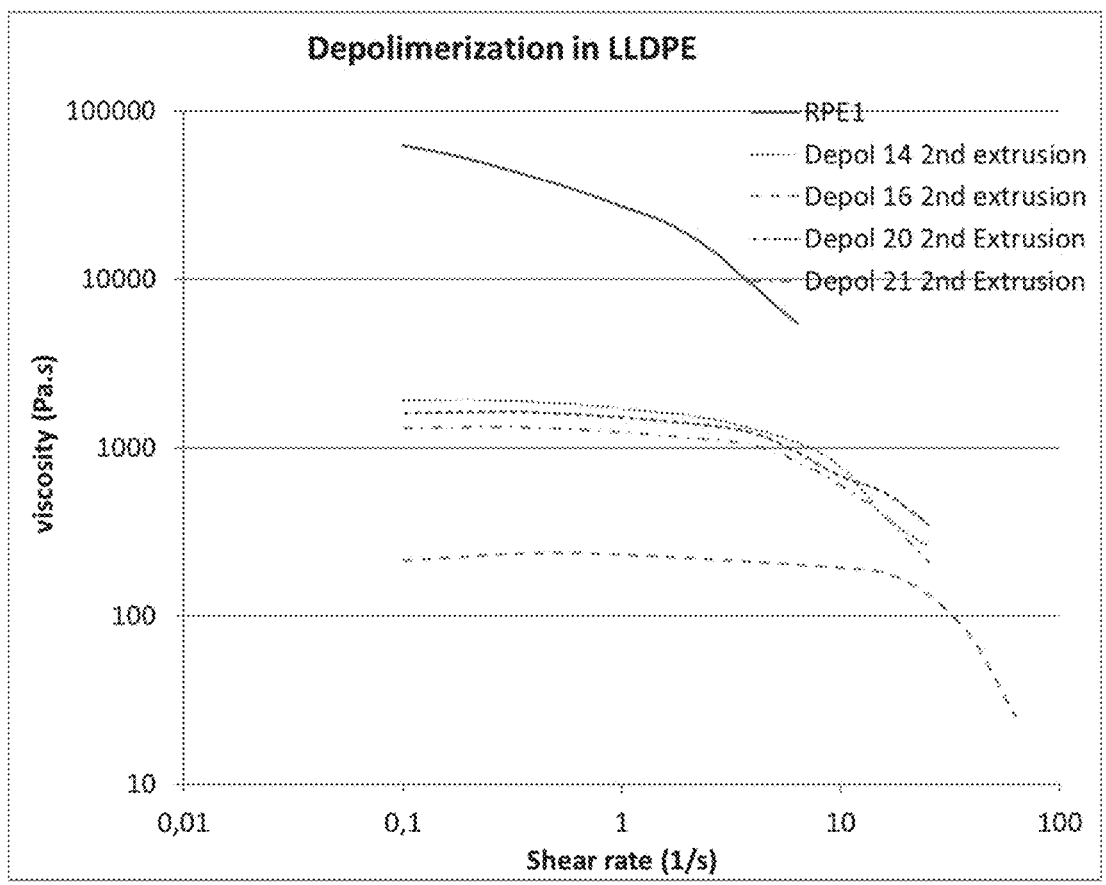
FIG. 25 shows rheology results for several samples, showing a viscosity reduction.

The Rheological results are shown in FIG. 25. As showed for depolymerized samples, the process in cascade at lower temperature degrades the LLDPE resulting in a flat rheological curve, reaching wax characteristic viscosity. The use of FeSt(II) showed some advantage considering the lower viscosity reached, at this temperature, when compared the samples degraded only with temperature, having a viscosity of almost 10× lower. The use of FeSt(II) demonstrated to be more effective than increasing in the residence time, in the multiple steps extrusion.

Figure 26:
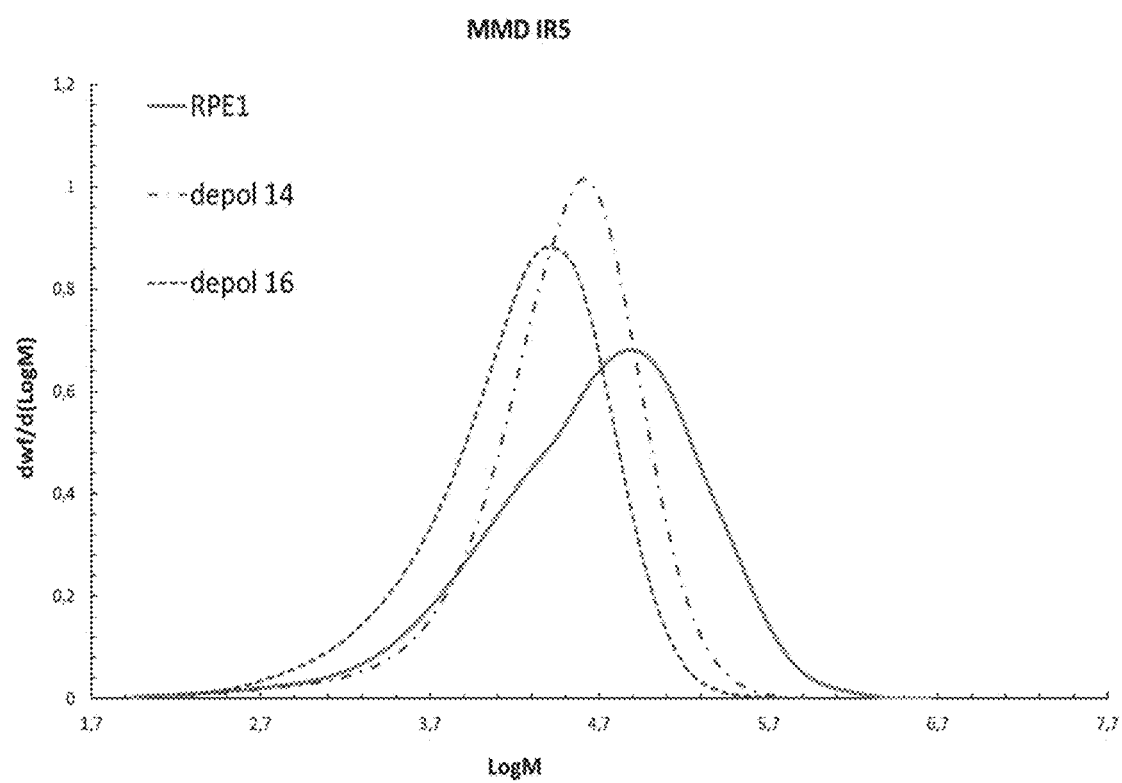
FIG. 26 shows GPC curves for depolymerized resins.

GPC results are shown in FIG. 26 and Table 10 below.

TABLE 10

| | IR5 | RPE1 | Depol 14 | Depol 16 |
|---|---|---|---|---|
| Mw (g/mol) | 128,900 | 47,700 | 29,600 | |
| Mn (g/mol) | 23,600 | 12,400 | 6,800 | |
| Mw/Mn | 5.45 | 3.83 | 4.33 | |
| Mz (g/mol) | 487,000 | 98,200 | 67,800 | |
| Mz1 (g/mol) | 1,729,700 | 177,900 | 137,400 | |
| IV (dL/g) | 1.958 | 1.004 | 0.701 | |
It is evident that is possible to use lower temperature process, successively, to reduce the molecular weight of plastics waste, activing waxes level. The presence of iron (II) stearate gives an important decrease in molar mass values.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

The invention claimed is:

1. A method for producing a low viscosity polyethylene-based composition comprising:
melting a polyethylene-based composition;
decreasing a viscosity of the polyethylene-based composition; and
optionally, repeating the melting and the viscosity decreasing steps to form a low melt viscosity polyethylene-based composition;
wherein the melting and viscosity decreasing steps are performed at temperature that is equal to or greater than 400° C., residence time to of less than 2 min, and the polyethylene-based composition is in the presence of at least one free radical generator.

2. The method of claim 1, wherein the polyethylene-based composition has a viscosity of 200 to 250,000 Pa·s at 0.1 rad/s at 190° ° C. prior to the processing.

3. The method of claim 1, wherein the polyethylene-based composition resin is selected from petroleum-based resins, biobased resins and combinations thereof.

4. The method of claim 1, wherein the polyethylene-based composition resin is selected from virgin resins, recycled resins and combinations thereof, wherein the recycled resins are selected from post-consumer resin (PCR) and post-industrial resin (PIR).

5. The method of claim 1, wherein the polyethylene-based composition comprises combination of recycled resins, biobased resins and optionally petroleum resins.

6. The method of claim 1, wherein the polyethylene-based composition comprises polyethylene resin and from about 0.1 to 49 wt. % of a second resin selected from polyamide, nylon, ethylene-vinyl alcohol, polyethylene terephthalate, polypropylenes, polybutylenes, ethylene-vinyl acetate copolymers, polystyrenes, and combinations thereof.

7. The method of claim 1, wherein the polyethylene-based composition comprises from about 5 to about 20 wt. % of polypropylene, based on the sum of the polyethylene and the polypropylene resins weights.

8. The method of claim 1, wherein the melting and viscosity decreasing steps are performed at temperature ranging from greater than 400° C. to about 450° C.

9. The method of claim 1, wherein residence time to is less than 90 s.

10. The method of claim 1, wherein the at least one free radical generator is added in an amount ranging from about 0.01 to about 1.5 wt. %, relative to the weight of the polyethylene-based composition.

11. The method of claim 1, wherein the at least one free radical generator is a peroxide.

12. The method of claim 11, wherein the peroxide is one or more of the group consisting of 3-hydroxy-1,1-dimethylbutyl peroxyneodecanoate, a-cumyl peroxyneodecanoate, 2-hydroxy-1,1-dimethylbutyl peroxyneoheptanoate a-cumyl peroxyneoheptanoate, t-amyl peroxyneodecanoate, t-butyl peroxyneodecanoate, di(2-ethylhexyl) peroxydicarbonate, di(n-propyl) peroxydicarbonate, di(sec-butyl) peroxydicarbonate, t-butyl peroxyneoheptanoate, t-amyl peroxypivalate, t-butyl peroxypivalate, diisononanoyl peroxide, didodecanoyl peroxide, 3-hydroxy-1,1-dimethylbutylperoxy-2-ethylhexanoate, didecanoyl peroxide, 2,2'-azobis(isobutyronitrile), di(3-carboxypropionyl) peroxide, 2,5-dimethyl-2,5-di(2-ethylhexanoylperoxy)hexane, dibenzoyl peroxide, t-amylperoxy 2-ethylhexanoate, t-butylperoxy 2-ethylhexanoate, t-butyl peroxyisobutyrate, t-butyl peroxy-(cis-3-carboxy)propenoate, 1,1-di(t-amylperoxy)cyclohexane, 1,1-di(t-butylperoxy)-3,3,5-trimethylcyclohexane, 1,1-di(t-butylperoxy) cyclohexane, OO-t-amyl O-(2-ethylhexyl) monoperoxycarbonate, OO-t-butyl O-isopropyl monoperoxycarbonate, OO-t-butyl O-(2-ethylhexyl) monoperoxycarbonate, polyether tetrakis(t-butylperoxycarbonate), 2,5-dimethyl-2,5-di(benzoylperoxy)hexane, t-amyl peroxyacetate, t-amyl peroxybenzoate, t-butyl peroxyisononanoate, t-butyl peroxyacetate, t-butyl peroxybenzoate, di-t-butyl diperoxyphthalate, 2,2-di(t-butylperoxy)butane, 2,2-di(t-amylperoxy)propane, n-butyl 4,4-di(t-butylperoxy) valerate, ethyl 3,3-di(t-amylperoxy)butyrate, ethyl 3,3-di(t-butylperoxy)butyrate, dicumyl peroxide, a,a'-bis(t-butylperoxy)diisopropylbenzene, 2,5-dimethyl-2,5-di(t-butylperoxy) hexane, di(t-amyl) peroxide, t-butyl a-cumyl peroxide, di(t-butyl) peroxide, 2,5-dimethyl-2,5-di(t-butylperoxy)-3-hexyne, dicetil peroxi-dicarbonato, 3,6,9-triethyl-3,6,9-trimethyl-1,4,7-triperoxonane, tert-butylperoxy 2-ethylhexyl carbonate, tert-butyl-peroxide n-butyl fumarate (benzoate), dimyristoyl peroxydiicarbonate, 3,3,5,7,7-pentamethyl-1,2,4-trioxepane, tert-butyl hydroperoxide, bis (4-t-butylcyclohexyl) peroxydicarbonate, and 1,2,4,5,7,8-hexoxonane,3,6,9-trimethyl-3,6,9-tris(ethyl and propyl derivatives).

13. The method of claim 11, wherein the peroxide is a low-reactivity organic peroxide selected from the group consisting of 3,3,5,7,7-Pentamethyl-1,2,4-trioxepane, terc-butyl hydroperoxide, cumyl hidroperoxide, t-amyl hidroperoxide, or any mixtures thereof.

14. The method of claim 11, wherein the polyethylene-based composition is in the presence of at least one further free radical generator comprising one or more of the group consisting of nitroxide compounds, the nitroxide compounds being selected from 2,2,5,5-tetramethyl-1-pyrrolidinyloxy, 3-carboxy-2,2,5,5-tetramethyl-pyrrolidinyloxy, 2,2,6,6-tetramethyl-1-piperidinyloxy, 4-hydroxy-2,2,6,6-tetramethyl-1-piperidinyloxy, 4-methoxy-2,2,6,6-tetramethyl-1-piperidinyloxy, 4-oxo-2,2,6,6-tetramethyl-1-piperidinyloxy, bis-(1-oxyl-2,2,6,6-tetramethylpiperidine-4-yl)sebacate, 2,2,6,6-tetramethyl-4-hydroxypiperidine-1-oxyl)monophosphonate, N-tert-butyl-1-diethylphosphono-2,2-dimethyl propyl nitroxide, N-tert-butyl-1-dibenzylphosphono-2,2-dimethylpropyl nitroxide, N-tert-butyl-1-di(2,2,2-trifluoroethyl)phosphono-2,2dimethylpropyl nitroxide, N-tert-butyl-(1-diethylphosphono)-2-methyl-propyl nitroxide, N-(1-methylethyl)-1-cyclohexyl-1-(diethylphosphono) nitroxide, N-(1-phenylbenzyl)-(1-diethylphosphono)-1-methyl ethylnitroxide, N-phenyl-1-diethylphosphono-2,2-dimethyl propyl nitroxide, N-phenyl-1-diethylphosphono-1-methyl ethyl nitroxide, N-(1-phenyl 2-methyl propyl)-1-diethylphosphono-1-methyl ethyl nitroxide, N-tert-butyl-1-phenyl-2-methyl propyl nitroxide, and N-tert-butyl-1-(2-naphthyl)-2-methyl propyl nitroxide.

15. The method of claim 1, wherein the melting and viscosity decreasing steps are performed in the presence of an additive selected from metal salts.

16. The method of claim 15, wherein the metal salts are selected from the group consisting of zinc stearate, tin stearate, iron (II) stearate, iron (III) stearate, cobalt stearate, manganese stearate and any combinations thereof.

17. The method of claim 1, wherein the method is performed in a continuous process.

18. The method of claim 1, wherein the method is performed in a twin-screw extruder.

19. The method of claim 1, wherein the melting and viscosity decreasing steps are repeated and the method is performed in two extrusions or more.

20. The method of claim 1, wherein the repeated melting and viscosity decreasing steps are performed in a continuous loop system.

* * * * *